United States Patent
Taniguchi et al.

[11] Patent Number: 5,929,921
[45] Date of Patent: Jul. 27, 1999

[54] VIDEO AND AUDIO SIGNAL MULTIPLEX SENDING APPARATUS, RECEIVING APPARATUS AND TRANSMITTING APPARATUS

[75] Inventors: Kenshi Taniguchi, Katano; Tomotaka Takeuchi, Osaka; Masatoshi Tanaka, Ikoma, all of Japan

[73] Assignee: Matsushita Electric Industrial Co., Ltd., Osaka, Japan

[21] Appl. No.: 08/616,191

[22] Filed: Mar. 15, 1996

[30] Foreign Application Priority Data

Mar. 16, 1995 [JP] Japan ................................ 7-056995
Mar. 22, 1995 [JP] Japan ................................ 7-063180

[51] Int. Cl.⁶ .......................... H04N 7/08; H04N 7/084; H04N 7/087
[52] U.S. Cl. ......................... 348/484; 348/480; 348/481; 370/215; 370/263
[58] Field of Search .................. 348/480, 481, 348/482, 483, 484, 493, 540, 541, 546, 547; 370/215, 263, 267, 516, 518, 535, 537; 381/2; H04N 7/08, 7/084

[56] References Cited

U.S. PATENT DOCUMENTS 4,964,162 10/1990 McAdam et al. ..................... 348/481
5,534,933 7/1996 Yang ................................. 348/475

OTHER PUBLICATIONS

Proposed SMPTE Standard for Television, 24–Bit Digital Audio Format of HDTV Bit–Serial Interface, (First Draft, Nov. 6, 1995), pp. 1–18.

Primary Examiner—Nathan Flynn
Assistant Examiner—Vivek Sirvastava
Attorney, Agent, or Firm—Beveridge. DeGrandi, Weilacher & Young, LLP

[57] ABSTRACT

The present invention provides a video and audio signal multiplex transmitting apparatus having a video and audio signal multiplex sending apparatus for grouping audio data to packets of a fixed length in the sending side, and multiplexing video and audio signals by multiplexing horizontal and vertical phase signal outputs from horizontal and vertical counters that are in synchronization with a video signal to an audio data as video phase information, and a video and audio signal multiplex receiving apparatus provided with an audio packet interpolating device for separating the signal received to video and audio signals, detecting, if any audio data is lost, a lost audio data from a data block number of the audio data and audio clock phase information, and recovering an audio clock by means of horizontal and vertical counters and the clock phase information transmitted.

21 Claims, 15 Drawing Sheets

PRIOR ART

Fig. 13 (a)

| ADF | ADF | ADF | DID | DBN | DC | AF1-2 | AF3-4 | RATE | ACT | DELA0 | DELA1 | DELA2 | DELB0 | DELB1 | DELB2 | RSRV | RSRV | CS |
|---|---|---|---|---|---|---|---|---|---|---|---|---|---|---|---|---|---|---|

Fig. 13 (b)

| ADF | ADF | ADF | DID | DBN | DC | AD1 | AD1 | AD1 | AD2 | AD2 | AD2 | // | AD1 | AD1 | AD1 | AD2 | AD2 | AD2 | CS |
|---|---|---|---|---|---|---|---|---|---|---|---|---|---|---|---|---|---|---|---|

Fig. 13 (c)

| ADF | ADF | ADF | DID | DBN | DC | AUX | AUX | AUX | // | AUX | AUX | AUX | AUX | AUX | AUX | AUX | CS |
|---|---|---|---|---|---|---|---|---|---|---|---|---|---|---|---|---|---|

PRIOR ART

Fig. 14 (a)

| bit address | First column of subframe | Second column of subframe | Third column of subframe |
|---|---|---|---|
| b 9 | $\overline{b8}$ | $\overline{b8}$ | $\overline{b8}$ |
| b 8 | a u d 5 | a u d 1 4 | P |
| b 7 | a u d 4 | a u d 1 3 | C |
| b 6 | a u d 3 | a u d 1 2 | U |
| b 5 | a u d 2 | a u d 1 1 | V |
| b 4 | a u d 1 | a u d 1 0 | a u d 1 9 |
| b 3 | a u d 0 | a u d 9 | a u d 1 8 |
| b 2 | c h 2 | a u d 8 | a u d 1 7 |
| b 1 | c h 1 | a u d 7 | a u d 1 6 |
| b 0 | Z | a u d 6 | a u d 1 5 |

Fig. 14 (b)

| bit address | AUX DATA WORD |
|---|---|
| b 9 | $\overline{b8}$ |
| b 8 | P |
| b 7 | y 3 |
| b 6 | y 2 |
| b 5 | y 1 |
| b 4 | y 0 |
| b 3 | x 3 |
| b 2 | x 2 |
| b 1 | x 1 |
| b 0 | x 0 |

Fig. 15 (a)

| ADF | ADF | ADF | DID | DBN | DC | AF1-2 | AF3-4 | RATE | ACT | DELA0 | DELA1 | DELA2 | DELB0 | DELB1 | DELB2 | RSRV | RSRV | CS |
|---|---|---|---|---|---|---|---|---|---|---|---|---|---|---|---|---|---|---|

Fig. 15 (b)

| ADF | ADF | ADF | DID | DBN | DC | AD1 | AD1 | AD1 | AD2 | AD2 | AD2 | AD3 | AD3 | AD3 | AD4 | AD4 | AD4 | PI | PI | CS |
|---|---|---|---|---|---|---|---|---|---|---|---|---|---|---|---|---|---|---|---|---|

VIDEO AND AUDIO SIGNAL MULTIPLEX SENDING APPARATUS, RECEIVING APPARATUS AND TRANSMITTING APPARATUS

BACKGROUND OF THE INVENTION

1. Field of the Invention

The present invention relates to video and audio signal multiplex sending apparatus and receiving apparatus and a transmitting apparatus formed by combining them for sending and receiving video and audio multiplex signals for multiplexing an audio signal in a blanking period of a video signal.

2. Related Art of the Invention

In transmission and recording of video signals or audio signals, conventional analog systems have been more often replaced by digital systems smaller in image quality deterioration and sound quality deterioration. Specifically for a system used in a studio, a standard of STMPTE259M is provided for a system of transmitting video and audio signals through a transmission path (for example, "2-1-3. Digitization of Transmission in a Station, (1) 10B Scramble System"). It is a standard for serial digital interfacing, and a audio signal is multiplexed in a blanking period of a video signal, and transmitted according to the STMPTE259M system.

By referring to the drawings, a conventional video and audio signal multiplex transmitting apparatus of the SMPTE259M system is described below.

FIG. 11 is a block diagram showing a constitution of a conventional video and audio signal multiplex sending apparatus. The sending apparatus comprises a buffer memory 5 for temporarily storing an audio signal, an audio clock oscillator 3 for outputting an audio clock, a video clock oscillator 4 for outputting a video clock and a signal multiplexer 6 for multiplexing the video and audio signals.

In FIG. 11, a digital video signal is applied to the signal multiplexer 6 through a video signal input terminal 1. On the other hand, a digital audio signal is applied through an audio signal input terminal 2, temporarily stored in the buffer memory 5 according to an audio clock outputted by the audio clock oscillator 3, then, read out of the buffer memory 5 according to a video clock outputted by the video clock oscillator 4, and the audio signal read is applied to the signal multiplexer 6. In the operation, because the frequency of video clock is higher than that of the audio clock, thus, reading of the audio signal is faster than writing, the reading of the audio signal is stopped temporarily, and the audio signal data is multiplexed only in a blanking period.

The signal multiplexer 6, after multiplexing the audio signal read out of the buffer memory 5 in a blanking period of the video signal that is applied through the video signal input terminal 1, outputs the multiplex signal to a multiplex signal output terminal 7. Here, the video clock outputted from the video clock oscillator 4 is synchronous with the frequency of video signal, and the audio clock outputted from the audio clock oscillator 3 is synchronous with the audio signal input.

The buffer memory 5 is employed between the audio signal input terminal 2 and the signal multiplexer 6, because the video and audio signals are digitized at different frequencies, and it is required to convert the frequency of audio signal to that of the video signal, which is achieved by storing the audio signal in the buffer memory 5 by means of the audio clock, and read out of the buffer memory 5 by the video clock.

FIG. 12 is a block diagram showing a constitution of a conventional video and audio signal multiplex receiving apparatus. The receiving apparatus comprises a signal separator 12 for separating video and audio signals of a multiplex signal, a buffer memory 14 for temporarily storing the audio signal separated, a video clock oscillator 15 for outputting a video clock, a write address generator 16 for generating a write address according to the video clock, an audio clock oscillator 17 for generating an audio clock, a read address generator 18 for generating a read address according to the audio clock, a phase comparator 19 for comparing the write and read addresses and the like.

In FIG. 12, a multiplex signal applied through a multiplex signal input terminal 11 (for example, a multiplex signal outputted from a video and audio signal multiplex sending apparatus of FIG. 11) is separated to video and audio signals by the signal separator 12, and the video signal is outputted to the video signal output terminal 13. The other signal, that is, the audio signal is required to be converted to a frequency identical with that of an original audio signal, because it has been converted to a frequency same as that of the video signal in the sending side. Thus, the audio signal separated is temporarily stored in the buffer memory 14 according to a write address generated by the write address generator 16 by means of a video clock outputted from the video clock oscillator 15. In the operation, only the audio signal is selected and written by suspending the writing operation, in contrast with the case of sending a signal. The audio signal stored in the buffer memory 14 is read according to a read address outputted by the read address generator 18 by means of an audio clock that is outputted by the audio clock oscillator 17. In order to recover an audio clock at a frequency identical with that of the signal sent, the phases of write and read addresses are compared with each other by the phase comparator 19, and a clock generated by the audio clock oscillator 17 is controlled according to a result of the comparison. Here, a circuit formed by the audio clock oscillator 17 and the phase comparator 19 provides a phase locked loop (hereinafter referred to as PLL). An audio signal read out of the buffer memory 14 is outputted to an audio signal output terminal 20.

In such multiplex transmission system as described above, however, it is a problem that the circuit is increased in size, since the recovery of a clock is affected by an accumulation of the buffer memory, in order to control the effect, and a phase relation of an audio signal with that of a video signal cannot be stored in the sending and receiving sides, as a residual phase change is caused in a clock smoothed by the PLL circuit, because a voltage level controlled by the PLL can be adjusted only by a phase difference between the R and W addresses of buffer memory, and a fine adjustment is unavailable. This is a first problem that the invention is to solve.

S17.100 of SMPTE also provides a standard for multiplexing audio digital data or an additional data in a supplemental data area for serial digital video signals according to a standard of SMPTE 259M. In other words, the standard provides for transmitting a digital audio signal in a blanking period of a video signal which is a main signal. As for an audio system, provisions of AES3-1991 (ANSI S4.40-1991) are applied correspondingly. According to the standard for transmitting a digital audio signal as a serial digital signal, three packets are provided: control packet, audio packet and additional packet.

FIG. 13 shows data formats of the three packets. FIG. 13(a) shows a data format of the control packet. Thus, the control packet comprises a sequence of words of 10 bits, and is fixed to seventeen words for a composite system and nineteen words for a component system. An ANC data flag (ADF) is of one word (3FCh) for a composite system and three words (000h, 3FFh, 3FFh) for a component system. Data ID (DID) indicates to which of audio groups 1, 2, 3 and 4 the control packet pertains. A data block number (DBN) is constantly fixed to 200h. Data count (DC) is constantly fixed to 20Ch (twelve words). ATF1-2 shows an audio frame number for ch1 and ch2. AFT3-4 shows an audio frame number for ch3 and ch4. RATE specifies a sampling frequency of the audio ch pairs. ACT shows an active ch. DELA0 to DELA2 or DELB0 to DELB2 shows a relative delay of an audio signal to a video signal expressed by a multiple of sampling interval. CS is an error detection code of the control packet.

The control packet is always transmitted once before each field. By means of the control packet, a sampling frequency, synchronization or non-synchronization with a video signal, delay in relation with the video signal, presence or absence of an audio signal and audio frame number are provided. If the control packet is not received, it is determined that the audio data is in synchronization with the video signal at a sampling frequency of 48 kHz. The sampling frequency is set to either 32, 44.1 or 48 kHz according to a transmission speed of the audio packet.

FIG. 13(b) shows a data format of the audio packet. Thus, the audio packet comprises a sequence of words of 10 bits, and the number of words is variable. An ANC data flag (ADF) is one word (3FCh) for a composite system and three words (000h, 3FFh, 3FFh) for a component system. Data ID (DID) shows to which of audio groups 1, 2, 3 and 4 the audio packet pertains. Data block number (DBN) is a serial number applied to audio packets that pertain to a same audio group, when audio signals sequentially applied are grouped to several audio packets, and has a value periodically changed in a range of 1 to 255 assigned thereto. Data count (DC) indicates the number of words contained in user data. The user data is a subframe AD1 or AD2 comprising units of three words, and the number of words of the user data is 255 at the maximum. The subframe AD1 or AD2 has data concerning digital audio data of 20 bits in the MSB side assigned thereto. To CS, an error detection code of the audio packet is assigned.

Now, contents of bit addresses of 30 bits of the subframe AD1 or AD2 are shown in FIG. 14(a). Thus, a bit sync (Z) is for showing whether the subframe is followed by a new channel status block. If it is followed by a channel status block, then, Z=1, and if not, then, Z=0. Ch1 and ch2 are for identification of audio ch1 to 4. Moreover, aud0 to aud19 are digital audio data of 20 bits expressed linearly by a complement of 2. A validity bit (V) indicates the validity of an audio sample, and V=1, if digital audio data of a subframe is suitable for conversion to an analog audio signal, while V=0, if it is not. A user bit (U) is for transmitting user data specified by a user. A channel status bit (C) is for transmitting information related to an audio channel, and a block consists of channel status bits corresponding to a 192 bits. As described above, the block sync of a subframe followed by the block is at Z=1. A parity bit (P) is of an even number for 26 bits of a subframe, excluding those of b9 in the first, second and third columns.

FIG. 13(c) shows a data format of the additional packet. Thus, the additional packet comprises a sequence of words of 10 bits, and the number of words is variable. An ANC data flag (ADF) is one word (3FCh) for a composite system and three words (000h, 3FFh, 3FFh) for a component system. Data ID (DID) shows to which of audio groups 1, 2, 3 and 4 the additional packet pertains. Data block number (DBN) is a serial number applied to additional packets that pertain to a same audio group, when 4 bits in the LSB side of digital audio data of an audio group are subgrouped, and has a value periodically changed in a range of 1 to 255 assigned thereto. Data count (DC) indicates the number of words in AUX column. Data concerning to digital audio data of 4 bits in the LSB side is assigned to the AUX consisting of words of 10 bits. CS is an error detection code of the additional packet.

Now, contents of bit addresses of 10 bits of the AUX are shown in FIG. 13(b). Thus, 4 bits in the LSB side of the subframe AD1 are assigned to x0 to x3. The LSB of them is assigned to x0. Then, 4 bits in the LSB side of the subframe AD2 are assigned to y0 to y3. The LSB of them is assigned to y0. P is an even number parity for b0 to b7.

An apparatus completely meeting the standard is operated in two modes: 24-bit mode for transmitting 24-bit audio signals and 20-bit mode for transmitting 20-bit audio signals. In the 24-bit mode, data corresponding to 20 bits in the MSB side thereof is transmitted by the audio packet, and the balance corresponding to 4 bits by the additional packet. Then, in order to simplify a circuit for reproduction in the AES format, audio and additional packets must be transmitted in a same blanking period. Besides, the audio and additional packets are required to be transmitted adjacently. In this mode, audio signals of an accuracy of 24 bits can be transmitted in four to twelve channels. In contrast, in the 20-bit mode, all 20 bits can be transmitted by the audio packet, the additional packet is unused. In this mode, audio signals of an accuracy of 20 bits can be transmitted in four to sixteen channels.

According to such conventional method, however, if the audio packet is lost due to an error in a transmission path, interpolation of the lost packet is unachievable, because the length of the packet, which is variable, is unpredictable. It has been, therefore, a problem that such information as of audio signals may be caused, leading to a loud noise. This is a second problem that the invention is to solve.

SUMMARY OF THE INVENTION

It is an object of the invention to provide a video and audio multiplex transmitting apparatus allowing a phase relation between image and audio signals to be saved at the sending and receiving sides and achieving transmission of audio signals that causes less jitter and noise.

To achieve the above objects, the invention provides a video and audio signal multiplex sending apparatus comprising a horizontal counter for providing a horizontal phase signal output of a video signal, a vertical counter for providing a vertical phase signal output of the video signal, an audio clock signal multiplexing circuit for multiplexing audio clock information with an audio signal according to the horizontal and vertical phase signal outputs and signal multiplexing means for multiplexing the audio signal multiplexed with the audio clock information and the video signal, and sending the multiplex signal.

More, to achieve the above objects, the invention provides a video and audio signal multiplex receiving apparatus comprising signal separating means for receiving a multiplex signal of an audio signal multiplexed in a blanking period of a video signal from the video and audio signal multiplex sending apparatus according to claim 1, and separating the multiplex signal received to a video signal and an audio signal multiplexed with audio clock information, the multiplex signal being a digital signal having a data format of a fixed length, a horizontal counter for providing a horizontal phase signal output of the video signal separated, a vertical counter for providing a vertical phase signal output of the video signal, an audio clock recovery circuit for recovering an audio clock from the audio clock information multiplexed with the audio signal according to the horizontal and vertical phase signal outputs, a buffer memory for temporarily storing the audio signal separated, and read the audio signal stored by using the audio clock recovered, and an audio signal processing circuit for processing the audio signal read according to the audio clock.

Further, to achieve the above objects, the invention provides a video and audio signal multiplex receiving apparatus comprising signal separating means for receiving a multiplex signal of an audio signal multiplexed in a blanking period of a video signal from the video and audio signal multiplex sending apparatus, and separating the multiplex signal received to a video signal and an audio signal multiplexed with audio clock information, the multiplex signal being a digital signal having a data format of a fixed length, a horizontal counter for providing a horizontal phase signal output of the video signal separated, a vertical counter for providing a vertical phase signal output of the video signal, an audio clock recovery circuit for recovering an audio clock from the audio clock information multiplexed with the audio signal according to the horizontal and vertical phase signal outputs, a clock oscillator for generating a clock that is controlled by a control voltage, a phase comparator for comparing an output of the clock oscillator with that of the audio clock recovery circuit to obtain the control voltage for the clock oscillator, a buffer memory for temporarily storing the audio signal separated, and reading the audio signal stored by using the output of the clock oscillator, and an audio signal processing circuit for processing the audio signal read according to the output of the clock oscillator.

More, to achieve the above objects, the invention provides a video and audio signal multiplex receiving apparatus comprising signal separating means for receiving a multiplex signal of an audio signal multiplexed in a blanking period of a video signal from the video and audio signal multiplex sending apparatus, and separating the multiplex signal received to a video signal and an audio signal multiplexed with audio clock information, the multiplex signal being a digital signal having a data format of a fixed length, a horizontal counter for providing a horizontal phase signal output of the video signal separated, a buffer memory for temporarily storing the audio signal separated, a digital phase comparator for comparing an output from the buffer memory with the horizontal phase signal output, and a clock oscillator for generating a clock according to an output of the digital phase comparator, wherein the audio signal stored in the buffer memory is outputted by using an output of the clock oscillator.

Further, to achieve the above objects, the invention provides a video and audio signal multiplex receiving apparatus comprising signal separating means for receiving a multiplex signal of an audio signal multiplexed in a blanking period of a video signal from the video and audio signal multiplex sending apparatus, and separating the multiplex signal received to a video signal and an audio signal multiplexed with audio clock information, the multiplex signal being a digital signal having a data format of a fixed length, a buffer memory for temporarily storing the audio signal separated, an audio clock recovery circuit for recovering an audio clock from an audio signal that is outputted from the buffer memory, and an audio signal processing circuit for processing the audio signal outputted from the buffer memory according to an output of the audio clock recovery circuit, wherein the audio signal stored in the buffer memory is outputted by using the output of the audio clock recovery circuit.

Furthermore, to achieve the above objects, the invention provides a video and audio signal multiplex receiving apparatus comprising signal separating means for receiving a multiplex signal of an audio signal multiplexed in a blanking period of a video signal from the video and audio signal multiplex sending apparatus, and separating the multiplex signal received to a video signal and an audio signal multiplexed with audio clock information, the multiplex signal being a digital signal having a data format of a fixed length, a buffer memory for temporarily storing the audio signal separated, an audio clock recovery circuit for recovering an audio clock from an audio signal that is outputted from the buffer memory, a clock oscillator for generating a clock for audio signal processing, the clock being controlled by a control voltage, a phase comparator for comparing an output of the clock oscillator with that of the audio clock recovery circuit to obtain the control voltage of the clock oscillator, and an audio signal processing circuit for processing the audio signal outputted from the buffer memory according to an output of the clock oscillator, wherein the audio signal stored in the buffer memory is outputted by using the output of the clock oscillator.

According to the above-described constitution, image and audio signal multiplex sending, receiving apparatus and transmitting apparatus allowing a phase relation of an audio signal to an image signal to be saved in the sending and receiving sides and capable of reproducing an audio signal of high quality with less jitter can be provided by a relatively compact circuit constitution.

To achieve the above objects, the invention provides an audio packet interpolating device comprising memory means for temporarily storing audio packet data included in at least an audio packet, the audio packet being fixed-length word and including audio data and data related to other information, data block number detecting means for detecting a data block number from the audio packet data read from the memory means according to a predetermined order, the data block number being a serial number applied to the audio packet, lost audio packet detecting means for detecting a lost audio packet on the basis of the data block number, interpolation data generating means for generating interpolation data corresponding to the lost audio packet by using the audio packet data readable from the memory means, if any audio packet is lost, according to a result of detection by the lost audio packet detecting means, and interpolation data inserting means for outputting the interpolation data according to an order in correspondence with the lost audio packet if any audio packet is lost, and outputting the audio packet data read from the memory means if no audio packet is lost, according to the result of detection by the lost audio packet detecting means.

Further, to achieve the above objects, the invention provides an audio packet interpolating device comprising memory means for temporarily storing audio packet data included in at least an audio packet, the audio packet being fixed-length word and including audio data and data related to other information, clock phase information detecting means for detecting clock phase information from the audio packet data read from the memory means according to a FIFO order, the clock phase information representing a location of an audio signal in relation to a video signal for synchronization of frequency and phase between the audio and video signals that are independent of each other, sampling frequency detecting means for detecting a sampling frequency for the audio signal obtained from the audio packet data, estimated value generating means for generating an estimated value relating to the clock phase information included in the audio packet data read from the memory means by using the clock phase information contained in separate audio packet data that is readable from the memory means and the sampling frequency, lost audio packet detecting means for detecting a lost audio packet on the basis of the clock phase information detected by the clock phase information detecting means and the estimated value, interpolation data generating means for generating interpolation data corresponding to the lost packet by using the audio packet data readable from the memory means, if any audio packet is lost, according to a result of detection by the lost audio packet detecting means, and interpolation data inserting means for outputting the interpolation data according to an order in correspondence with the lost audio packet if any audio packet is lost, and outputting the audio packet data read from the memory means if no audio packet is lost, according to the result of detection by the lost audio packet detecting means.

Furthermore, to achieve the above objects, the invention provides an audio packet interpolating device comprising memory means for temporarily storing audio packet data included in at least an audio packet, the audio packet being fixed-length word and including audio data and data relating to other information, data block number detecting means for detecting a data block number from the audio packet data read from the memory means according to a predetermined order, the data block number being a serial number applied to the audio packet, first lost audio packet detecting means for detecting a lost audio packet according to the data block number, clock phase information detecting means for detecting clock phase information from the audio packet data read from the memory means according to a FIFO order, clock phase information representing a location of an audio signal in relation to a video signal for synchronization of frequency and phase between the audio and video signals that are independent of each other, sampling frequency detecting means for detecting a sampling frequency for the audio signal obtained from the audio packet data, estimated value generating means for generating an estimated value relating to the clock phase information included in the audio packet data read from the memory means by using the clock phase information contained in the audio packet data that is readable from the memory means and the sampling frequency, second lost audio packet detecting means for detecting a lost audio packet on the basis of the clock phase information detected by the clock phase information detecting means and the estimated value, interpolation data generating means for generating interpolation data corresponding to the lost packet by using the audio packet data readable from the memory means, if any audio packet is lost, according to a result of detection by the first and second lost audio packet detecting means, and interpolation data inserting means for outputting the interpolation data according to an order in correspondence with the lost audio packet if any audio packet is lost, and outputting the audio packet data read from the memory means if no audio packet is lost, according to the result of detection by the first and second lost audio packet detecting means.

Although it has been a problem of a conventional video and audio signal multiplex transmitting apparatus that a lack of information of audio signals is caused, leading to a loud noise, because the audio packet is of a variable length, and cannot be interpolated once it is lost, according to the constitution, an audio packet interpolating device causing less noises even when an audio packet is lost can be provided, and used with a video and audio signal multiplex transmitting apparatus.

By solving the two problems, a phase relation between video and audio signals can be saved at the sending and receiving side, and transmission of audio signals with less jitter and noise can be achieved in a video and audio signal multiplex transmitting apparatus.

BRIEF DESCRIPTION OF THE DRAWINGS

These and other objects, advantages, features, and uses will become more apparent as the description proceeds, when considered with the accompanying drawings in which:

FIG. 13 is data formats of packets according to a conventional serial digital transmission system with (a) showing a data format of a control packet, (b) that of an audio packet and (c) that of an additional packet;

FIG. 14(*a*) is a chart showing bit addresses of 30 bits of a subframe AD1 or AD2 for the audio packet of FIG. 13(*b*), and FIG. 14(*b*) is a chart showing bit addresses of 10 bits of AUX for the additional packet of FIG. 13(*c*); and FIG. 15 is data formats of packets in a serial digital signal transmitting apparatus corresponding to that of the embodiment with (a) showing a data format of a control packet and (b) that of an audio packet.

DESCRIPTION OF PREFERRED EMBODIMENTS

Figure 1:
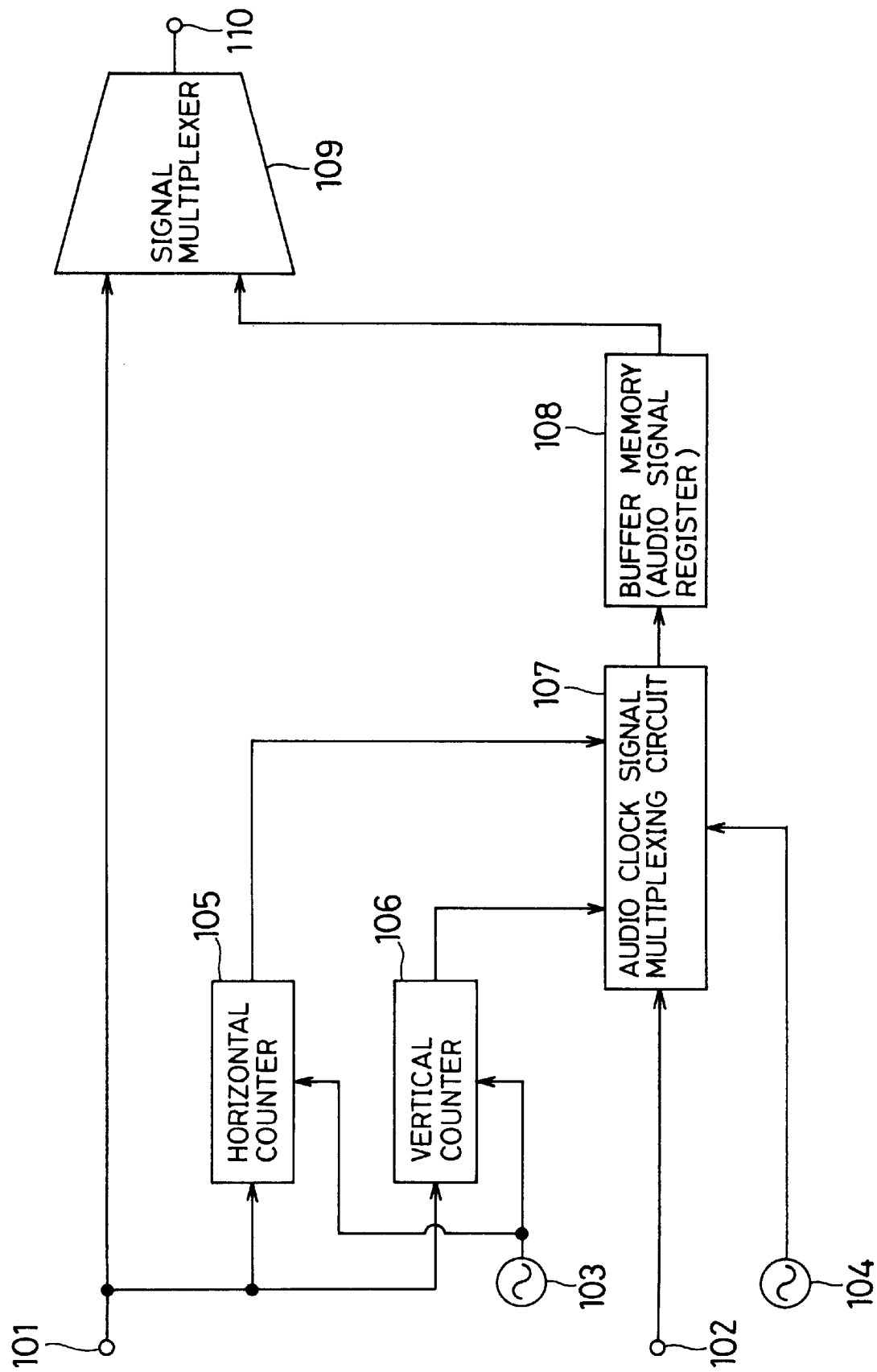
FIG. 1 is a block diagram showing a constitution of a video and audio signal multiplex sending apparatus according to an embodiment of the invention.

Referring now to FIG. 1, there is shown therein a block diagram showing a constitution of a video and audio signal multiplex sending apparatus according to a first embodiment of the invention. As shown in the figure, a video and audio signal multiplex sending apparatus according to the embodiment is provided with a video signal input terminal 101 for applying a digital video signal and an audio signal input terminal 102 for applying a digital audio signal, and the video signal input terminal 101, on one hand, is connected with a signal multiplexer 109 for multiplexing video and audio signals, a horizontal counter 105 for providing a horizontal phase signal of a video signal and a vertical counter 106 for providing a vertical phase of a video signal. The audio signal input terminal 102, on the other hand, is connected with an audio clock signal multiplexing circuit 107 for multiplexing an input audio signal with audio clock information, and an output of the audio clock signal multiplexing circuit 107 is connected with a buffer memory (or an audio signal register) 108 for temporarily storing an audio signal. The signal multiplexer 109 is connected with an output of the buffer memory 108, and an output of the signal multiplexer 109 is connected with a multiplex signal output terminal 110. In the apparatus, the signal multiplexer 109 and multiplex signal output terminal 110 constitute signal multiplexing means.

A video clock oscillator 103 for generating a clock synchronous with a video signal and an audio clock oscillator 104 for generating a clock synchronous with an audio signal are provided, and an output of the video clock oscillator 103 is connected with the horizontal and vertical counters 105 and 106, while an output of the audio clock oscillator 104 is connected with the audio clock signal multiplexing circuit 107.

Now, the relation between video and audio signals is described. Digital audio signals are subgrouped to audio packets by each unit of specific audio group. The audio packets are sent in a blanking period (horizontal supplemental signal area) of a video signal which is a main signal. In other words, no or one or two audio packets are sent for a line of digital video signal. Here, regarding a sending order, a blanking period is followed by a digital active line to which data related with the digital video signal is assigned. Therefore, the digital audio signal is transmitted with a delay of one line from the digital video signal. The audio packet is data of a fixed length, in which audio clock information for synchronization with the video signal independent of the audio packet is provided. The audio clock information provides clock information set in accordance with the video signal, and is multiplexed in the audio clock signal multiplexing circuit 107 of FIG. 1.

Operation of a video and audio signal multiplex transmitting apparatus according to the first embodiment is described below by referring to the drawings.

First, a digitized video signal is inputted through the video signal input terminal 101, and applied through branch lines to the horizontal counter 105, vertical counter 106 and signal multiplexer 109, respectively. A digitized audio signal is also inputted through the audio signal input terminal 102, and applied to the audio clock signal multiplexing circuit 107.

A video clock from the video clock oscillator 103 is applied to the horizontal and vertical counters 105 and 106, and the horizontal counter 105 counts horizontal phase signals in the input video signal by using the video clock, and provides an output to the audio clock signal multiplexing circuit 107, while the vertical counter 106 counts vertical phase signals in the input video signal, and provides an output to the audio clock signal multiplexing circuit 107. Then, the audio clock signal multiplexing circuit 107 generates audio clock information according to the audio clock from the audio clock oscillator 104 and horizontal and vertical phase signals, and multiplexes the audio clock information with the audio signal.

The audio signal multiplexed with the audio clock information is outputted to the signal multiplexer 109 after it is once stored in the buffer memory 108, further multiplexed in a blanking period of the video signal by the signal multiplexer 109, and outputted through the multiplex signal output terminal 110.

As described, according to the embodiment, the audio clock used at the receiving side is sent after it is multiplexed with the audio signal as audio clock information. The audio signal can be synchronized with the video signal in the receiving side, as the audio clock information is determined by using horizontal and vertical phase signals in the video signal, and a phase relation between the audio and video signals are thereby reproduced in the receiving side.

Figure 2:
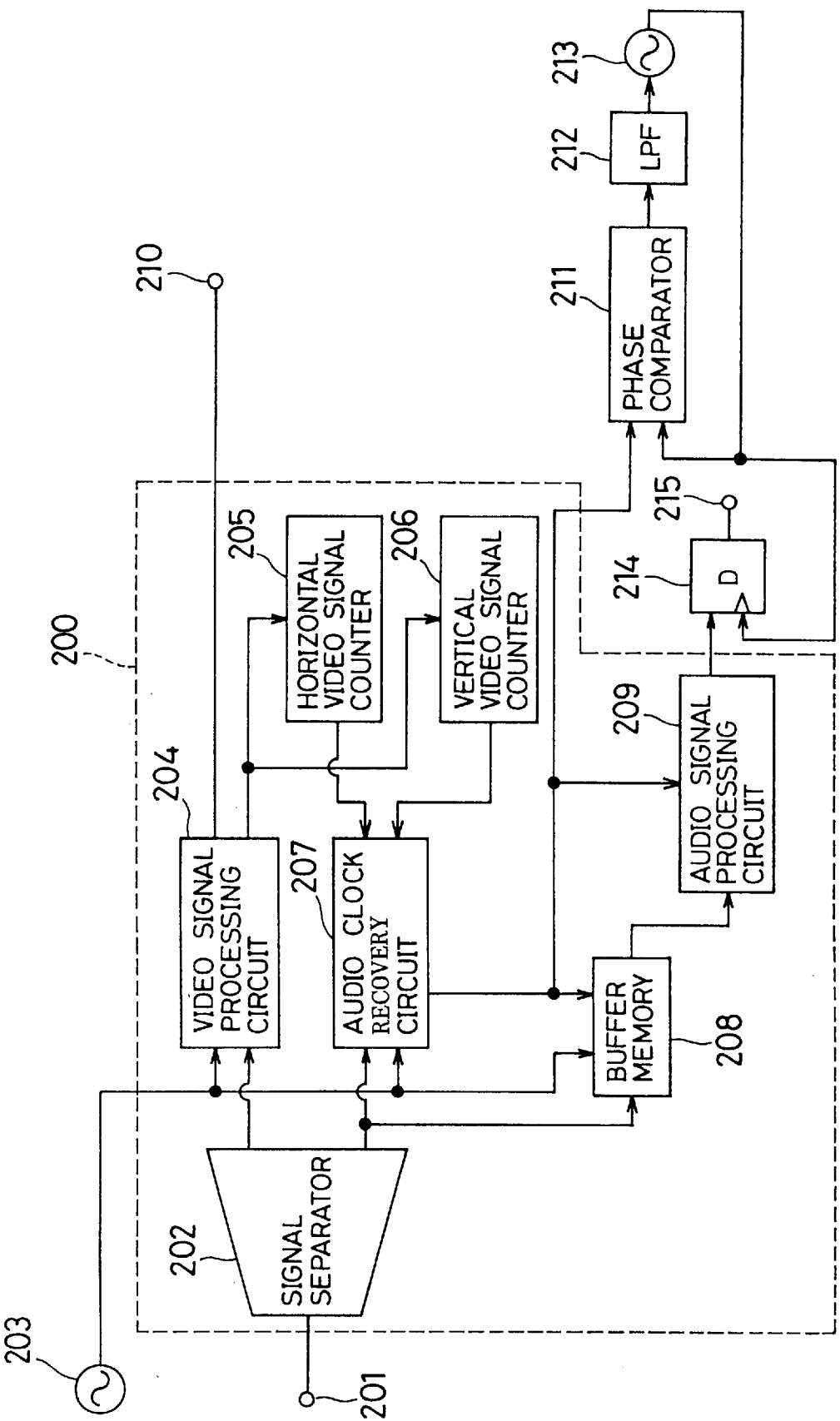
FIG. 2 is a block diagram showing a constitution of a video and audio signal multiplex receiving apparatus according to an embodiment of the invention.

FIG. 2 is a block diagram showing a constitution of a video and audio signal multiplex receiving apparatus according to a second embodiment of the invention. As shown in the figure, the video and audio signal multiplex receiving apparatus according to the embodiment corresponds to the sending apparatus of the first embodiment,, which applies similarly to receiving apparatuses according to embodiments below.

The receiving apparatus is provided with a multiplex signal input terminal 201 for receiving and inputting a multiplex video and audio signal, and the multiplex signal input terminal 201 is connected with a signal separator 202 for separating a video signal from an audio signal in the multiplex signal. A video clock oscillator 203 for generating a clock synchronous with the video signal is also provided, and an output thereof is connected with a video signal processing circuit 204 for processing the video signal separated, audio clock recovery circuit 207 for recovering an audio clock from audio clock information that is included in the audio signal separated and a buffer memory 208 for temporarily storing the audio signal.

A video signal output from the signal separator 202 is connected with the video signal processing circuit 204, and an audio signal output from the signal separator 202 is connected through a branch line to the audio clock recovery circuit 207 and buffer memory 208. An output of the video signal processing circuit 204 is connected with a video signal output terminal 210, while the other output is connected with a horizontal video signal counter 205 for counting horizontal phase signals in the video signal and a vertical video signal counter 206 for counting vertical phase signals in the video signal. an output of the audio clock recovery circuit 207 is connected with a buffer memory 208, an audio signal processing circuit 208 for processing an audio signal and a phase comparator 211 described below, and an output of the buffer memory 208 is, in turn, connected with an audio signal processing circuit 209.

An output of the phase comparator 211 is connected with a low-pass filter (hereinafter LPF) 212, the LPF 212 is connected with a clock oscillator 213 in the form of a voltage-controlled oscillator, and an output of the clock oscillator 213 is connected with the other input of the phase comparator 211 and a flip-flop 214 for holding an audio signal output from the audio signal processing circuit 209. Further, an output of the flip-flop 214 is connected with an audio signal output terminal 215. In the embodiment, the phase comparator 211, LPF 212 and clock oscillator 213 constitute a so-called phase lock loop (PLL). The multiplex signal input terminal 201 and the signal separator 202 provides signal separating means.

Now, operation of a video and audio signal multiplex receiving apparatus according to the second embodiment is described by referring to the drawings.

First, a multiplex signal received from the multiplex signal input terminal 201 is separated to video and audio signals by the signal separator 202. Here, the multiplex signal is a digital multiplex signal, for example, from the video and audio signal multiplex sending apparatus according to the first embodiment, has a data format of a fixed length, and is multiplexed with an audio signal in a blanking period of a video signal, which audio signal is further multiplexed with audio clock information.

On the other hand, a video clock synchronous with the video signal is outputted from the video clock oscillator 203, and the video signal processing circuit 204 processes the video signal from the signal separator 202 by using the video clock, and provides an output to the horizontal video signal counter 205, vertical video signal counter 206 and video signal output terminal 210. The horizontal video signal counter 205 counts horizontal phase signals in the video signal, and provides an output to the audio clock recovery circuit 207, while the vertical video signal counter 206 counts vertical phase signals in the video signal, and provides an output to the audio clock recovery circuit 207.

Then, the audio clock recovery circuit 207 recovers an audio clock from the audio clock information multiplexed with the audio signal that is separated by the signal separator 202, that is, an audio clock from the horizontal and vertical phase signals and audio clock information by using the output from the horizontal video signal counter 205, that from the vertical video signal counter 206 and video clock, and provides an output to the buffer memory 208, audio signal processing circuit 209 and phase comparator 211. However, the phase relation between the video and audio signals in the sending side can be reproduced in the receiving side by matching an audio clock signal from the audio clock recovery circuit 207 in phase with an audio signal that is being outputted from the buffer memory 208 for signal processing. In order to maintain the phase relation between the video and audio signals in the sending side, it is required, therefore, that a buffer memory having an amount of delay identical with that provided by the buffer memory 208 is contained in the audio clock recovery circuit 207. However, in the case accurate recovery of an audio clock is only for the frequency, and the phase is unconcerned, such buffer memory is not required in the audio clock recovery circuit 207. Even in such case, the audio signal can be reproduced without any problem. The buffer memory 208 only temporarily stores the audio signal separated by using the video clock, and thereafter reads it by means of the audio clock from the audio clock recovery circuit 207. The audio signal read out of the buffer memory 208 is processed in the audio signal processing circuit 209 by using the audio clock from the audio clock recovery circuit 207, and applied to the flip-flop 214.

Further, the phase comparator 211 compares the output from the audio clock recovery circuit 207 with those of the clock oscillator 213, and outputs a control voltage through the LPF 212 to the clock oscillator 213. An output of the clock oscillator 213 is provided through a branch line to the flip-flop 214, and the flip-flop 214 holds the audio signal from the audio signal processing circuit 209, removes a phase lag from the video clock, and outputs it to the audio signal output terminal 215.

Although the second embodiment is provided with the PLL circuit and flip-flop 214, it may be constituted, instead, only by a block 200 shown in a broken line and the video clock oscillator 203. In such case, as a circuit in the block 200 is operated basically with a system clock, that is, the video clock, LSI can be easily achieved, which is advantageous for providing a compact receiving circuit.

Figure 3:
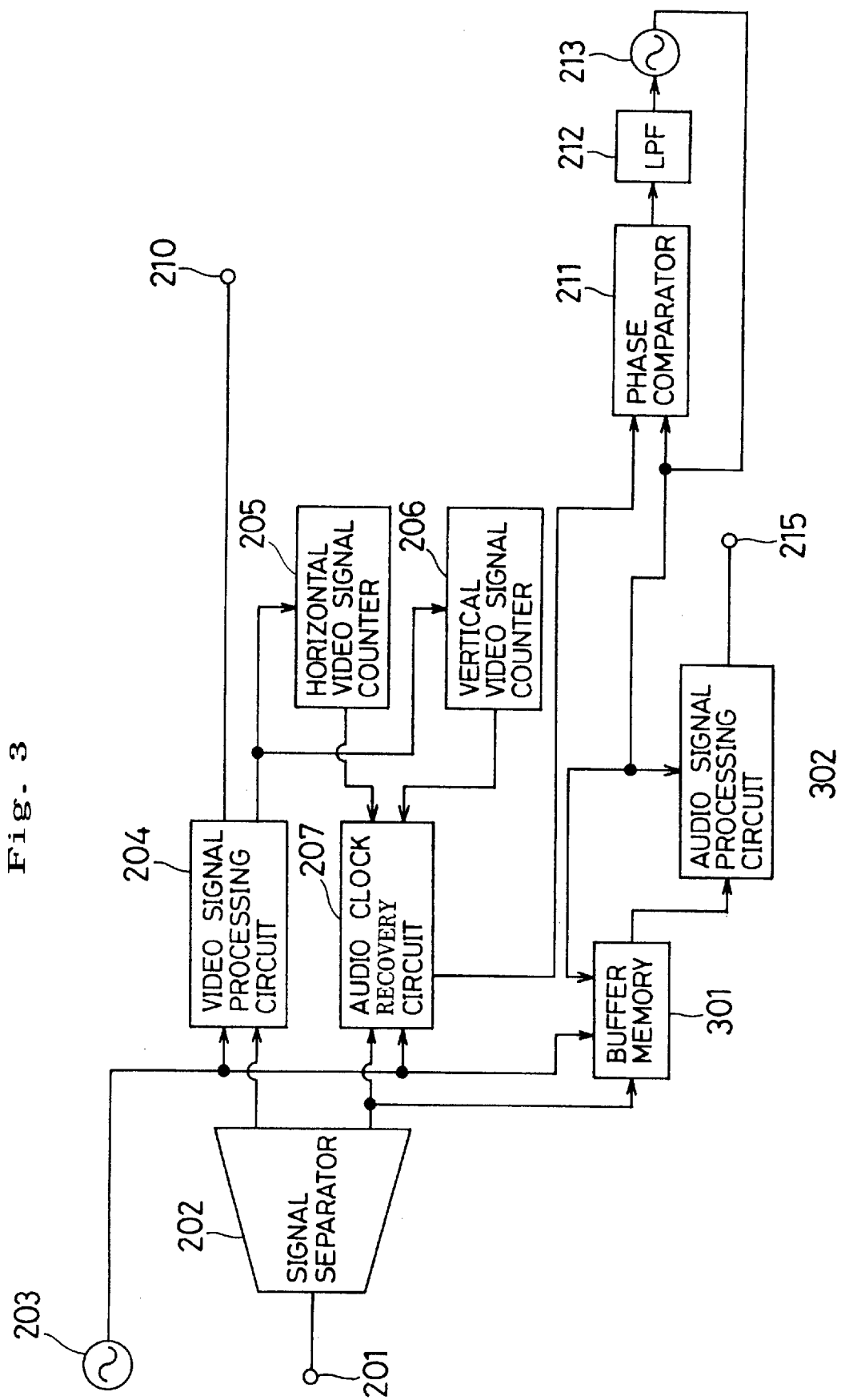
FIG. 3 is a block diagram showing a constitution of a video and audio signal multiplex receiving apparatus according to an embodiment of the invention.

FIG. 3 is a block diagram showing a constitution of a video and audio signal multiplex receiving apparatus according to a third embodiment of the invention. The receiving apparatus according to the embodiment is different from that of the second embodiment shown in FIG. 2 in that an output of a clock oscillator 213 is used, in contrast to the output of audio clock recovery circuit 207 in the second embodiment, for reading an audio signal from a buffer memory 208 and processing the audio signal in an audio signal processing circuit 209, as shown in FIG. 3, and the flip-flop of FIG. 2 is eliminated by using an audio clock smoothed by a PLL circuit.

The receiving apparatus according to the embodiment is operated similarly to the second embodiment through steps of inputting a multiplex signal through a multiplex signal input terminal 201, separating the multiplex signal to video and audio signals by a signal separator 202, processing the video signal separated by a video signal processing circuit 204, then, counting horizontal and vertical phase signals in the video signal, recovering an audio clock by using the phase signals, and temporarily storing the audio signal in a buffer memory 301 by using a video clock.

Then, the audio clock recovered by an audio clock recovery circuit 207 is applied to a phase comparator 211 in a PLL circuit, and compared with an output from a clock oscillator 213. A result of the comparison by the phase comparator 211 is provided through an LPF 212 to clock oscillator 213 and a control voltage. An output of the clock oscillator 213 is provided through branch lines, and used for reading of the audio signal from the buffer memory 301 and processing of the audio signal by an audio signal processing circuit 302. Thus, the audio signal is read from the buffer memory 301 by means of the output from the clock oscillator 213, that is, the audio clock smoothed, further processed by the audio signal processing circuit 302, and provided to an audio signal output terminal 215.

Figure 4:
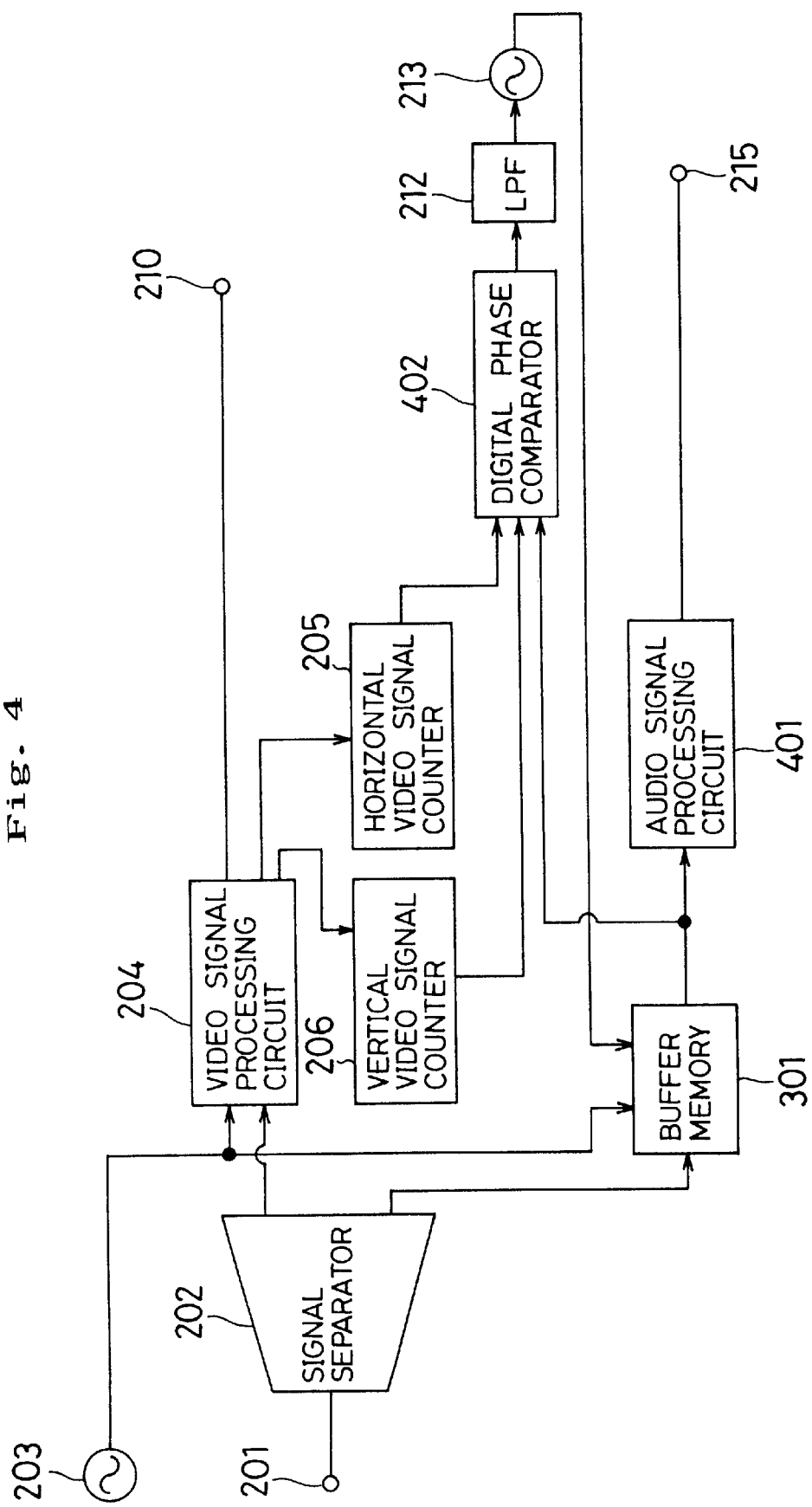
FIG. 4 is a block diagram showing a constitution of a video and audio signal multiplex receiving apparatus according to an embodiment of the invention.

FIG. 4 is a block diagram showing a constitution of a video and audio signal multiplex receiving apparatus according to a fourth embodiment of the invention. In FIG. 4, parts described in connection with the second or third embodiment are shown by reference numerals identical with those of FIGS. 2 or 3. Thus, a video and audio signal receiving apparatus according to the embodiment comprises a signal separator 202, video clock oscillator 203, video signal processing circuit 204, buffer memory 301, horizontal video signal counter 205, vertical video signal counter 206, audio signal processing circuit 401, LPF 212, clock oscillator 213, digital phase comparator 402 for comparing a horizontal phase signal output from the horizontal video signal counter 205 and a vertical phase signal output from the vertical video signal counter 206 with an audio signal read from the buffer memory 301 in terms of digital values and the like.

In the embodiment, a multiplex signal applied through a multiplex signal input terminal 201 is separated to video and audio signals by the signal separator 202, and the video signal separated is processed by the video signal processing circuit 204 by using a video clock output from the video clock oscillator 203, and provided to a video signal output terminal 210 and the horizontal and vertical video signal counters 205 and 206. On the other hand, an audio signal is once stored in the buffer memory 301 by means of the video clock.

The audio signal stored in the buffer memory 301 is read by means of an audio clock from the clock oscillator 213, provided to the audio signal processing circuit 401, and applied to the digital phase comparator 402. In the digital phase comparator 402, the audio signal read from the buffer memory 301 is compared with horizontal phase signals counted by the horizontal video signal counter 205 and vertical phase signals counted by the vertical video signal counter 206 in terms of digital values, and a control voltage is supplied through the LPF 212 to the clock oscillator 213. In such manner, reading from the buffer memory 301 can be achieved by using a clock that is smoothed in phase change. then, the audio signal processing circuit 401 processes the audio signal read from the buffer memory 301, and provides it to an audio signal output terminal 215.

In the embodiment, because the phase comparison is in terms of digital values, the phase comparator can be integrated in a digital LSI, which considerably facilitates constitution of a circuit.

Although the fourth embodiment is constructed such that a vertical phase signal from the vertical video signal counter 206 is applied to the digital phase comparator 402, it may be so constructed, in the case a phase lag by line may be allowed between video and audio signals, that no vertical phase signal is used.

Figure 5:
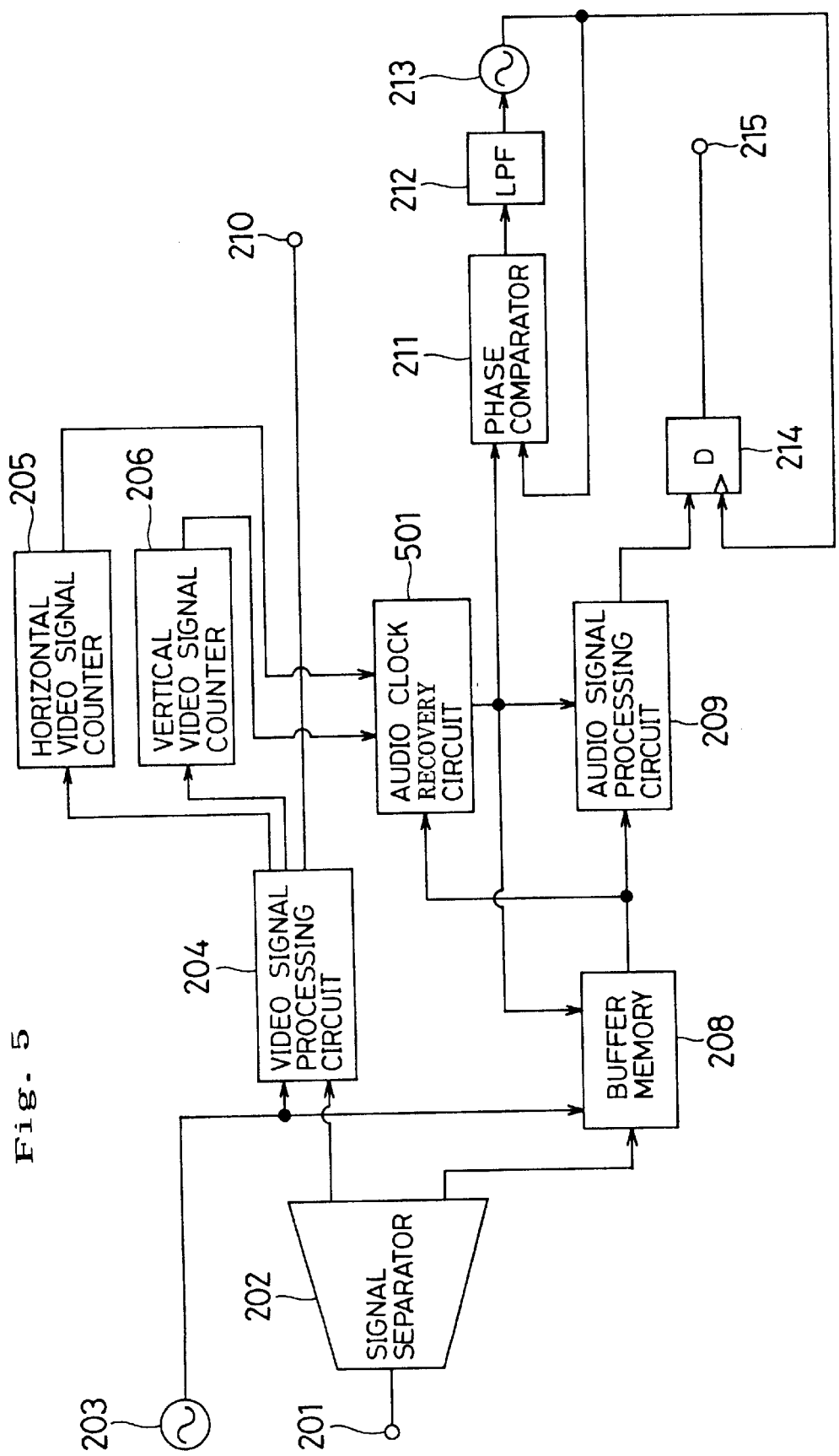
FIG. 5 is a block diagram showing a constitution of a video and audio signal multiplex receiving apparatus according to an embodiment of the invention.

FIG. 5 shows a constitution of a video and audio signal multiplex receiving apparatus according to a fifth embodiment of the invention. The video and audio signal multiplex receiving apparatus according to the embodiment comprises a signal separator 202, video clock oscillator 203, video clock processing circuit 204, horizontal video signal counter 205, vertical video signal counter 206, buffer memory 208, audio signal processing circuit 209, phase comparator 211, LPF 212, clock oscillator 213, flip-flop 214 and audio clock recovery circuit 501 for recovering an audio clock from an audio signal read from the buffer memory 208.

In the embodiment, a multiplex signal applied through a multiplex signal input terminal 201 is separated to video and audio signals by the signal separator 202, and the video signal separated is processed in the video signal processing circuit 204 by using a video clock output from the video clock oscillator 203, and provided to the video signal output terminal 210, the horizontal and vertical video clock counters 205 and 206. On the other hand, an audio signal is temporarily stored in the buffer memory 208 by using the video clock.

The audio signal stored in the buffer memory 208 is read by means of an audio clock recovered by the audio clock recovery circuit 501, and applied to the audio signal processing circuit 209. In the embodiment, the audio clock recovery circuit 501, unlike those of the second and third embodiments, receives an audio signal read from the buffer memory 208, and recovers an audio clock from audio clock information contained in the audio signal.

The audio clock output from the audio clock recovery circuit 501 is applied to the buffer memory 208, and also provided as an input to the audio signal processing circuit 209 and phase comparator 211, and the audio signal processing circuit 209 processes the audio signal read from the buffer memory 208 by using the audio clock, then provides an output to the flip-flop 214.

On the other hand, the phase comparator 211 compares an output of the clock oscillator 213 with the audio clock, and supplies a control voltage through the LPF 212 to the clock oscillator 213.

Further, the output of the clock oscillator 213 is applied to the flip-flop 214, and outputs an audio signal with a phase offset from the video signal removed by holding the audio signal output from the audio signal processing circuit 209 to the audio signal output terminal 215.

Since the recovery of audio clock is achieved by using the output of buffer memory 208 in the embodiment, a buffer for storing clock information in the audio clock recovery circuit 501 can be eliminated.

Figure 6:
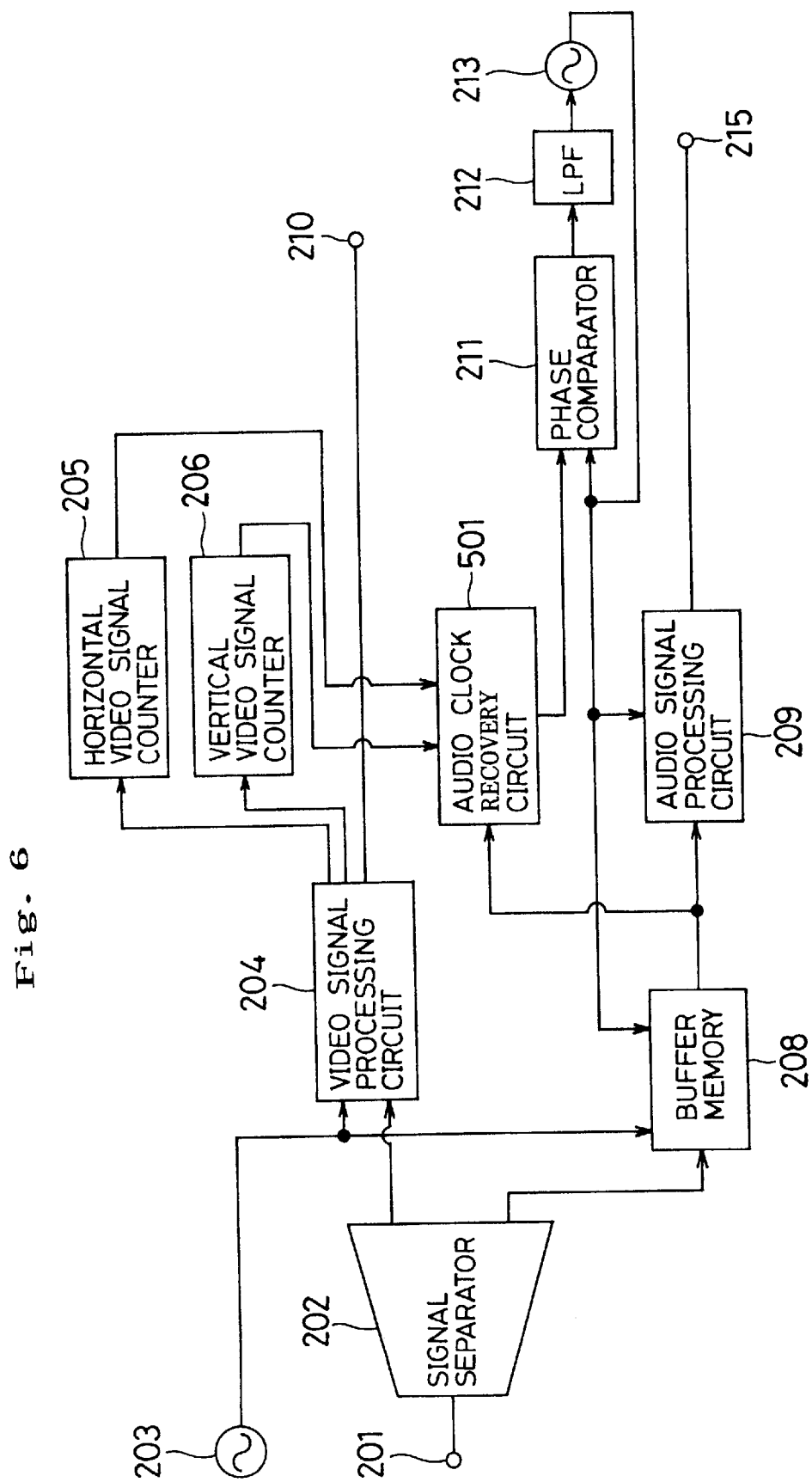
FIG. 6 is a block diagram showing a constitution of a video and audio signal multiplex receiving apparatus according to an embodiment of the invention.

FIG. 6 is a block diagram showing a constitution of a video and audio signal multiplex receiving apparatus according to a sixth embodiment of the invention. The receiving apparatus according to the embodiment is different from that of the fifth embodiment in that an output from a clock oscillator 213 is used, in contrast to the output of audio clock recovery circuit 501 in the fifth embodiment, for reading an audio signal from a buffer memory 208 and processing the audio signal in an audio signal processing circuit 209, as shown in FIG. 6, and the flip-flop of FIG. 5 is eliminated by using an audio clock smoothed by a PLL circuit.

While the sending apparatus according to the first embodiment and receiving apparatuses according to the second to sixth embodiments have been described above, by combining the sending apparatus according to the first embodiment with any one of the receiving apparatuses according to the second to sixth embodiments, a video and audio signal multiplex transmitting apparatus can be provided.

The audio clock information mentioned above may be of any format unless it is contradictory to the objects of the invention.

Although the apparatus according to the fifth embodiment is provided with the PLL and flip-flop 214, an almost similar effect can be obtained even without the circuit.

Figure 7:
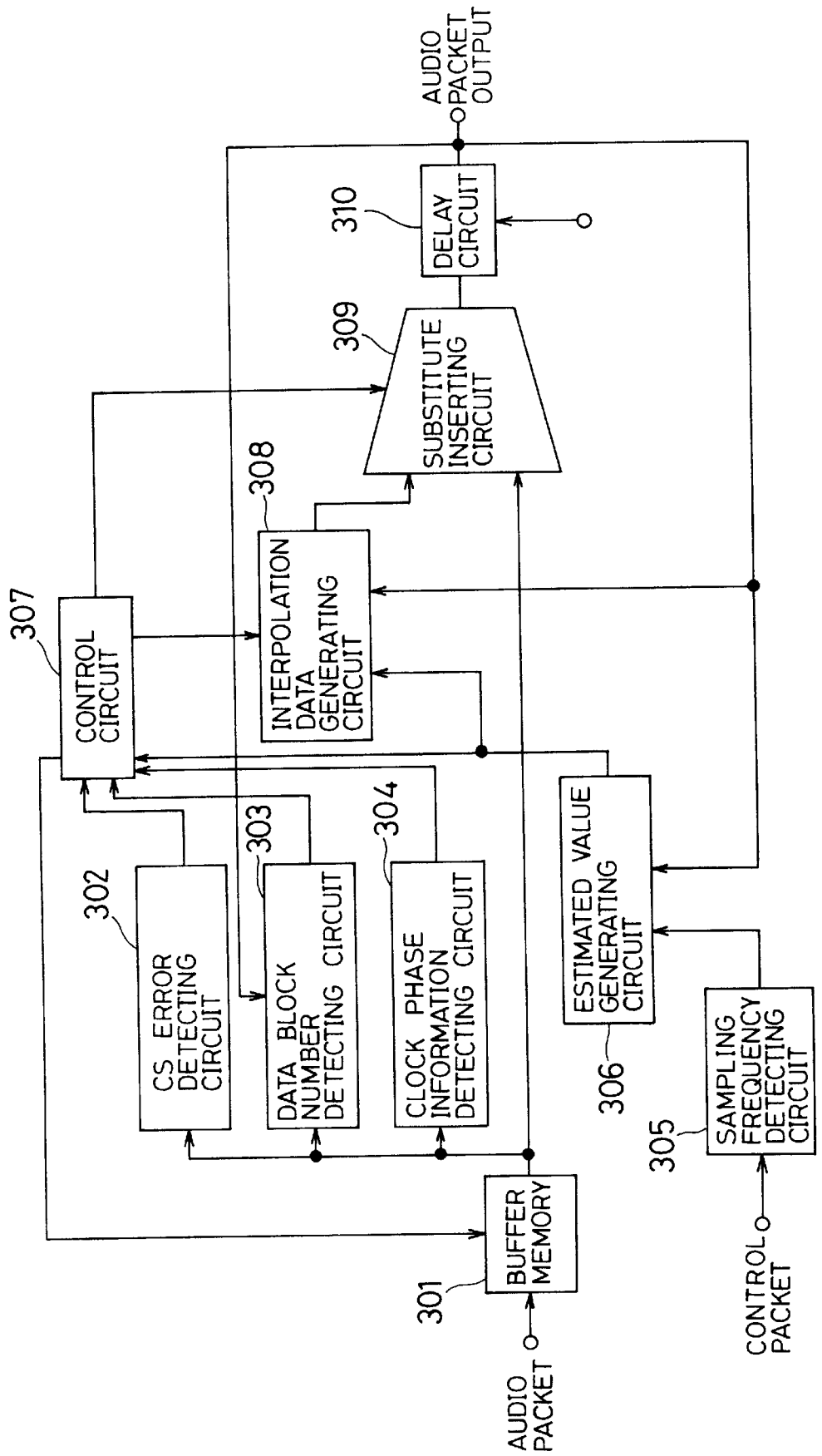
FIG. 7 is a block diagram showing a constitution of an audio packet interpolating device according to an embodiment of the invention.

FIG. 7 shows a constitution of an audio packet interpolating device according to an embodiment of the invention. Before describing the embodiment, specifications of a serial digital signal transmission system pertinent to the apparatus of the embodiment are explained. The transmission system is for transmitting digital video and audio signals as a serial digital signal. A digital video signal is processed as a main signal, while a digital audio signal is processed as a supplemental signal independent of the video signal. As for an audio signal, provisions of AES3-1991 (ANSI S4.40-1991) are applied correspondingly. An apparatus according to the embodiment relates to such digital audio signal which is supplemental. In a transmission system according to the invention, two packets, that is, control and audio packets are used.

FIG. 15 shows a data format of control and audio packets for a transmission system according to the embodiment. FIG. 15(a) shows a data format of the control packet. For the purpose of simplicity, specifications of the control packet are similar to those of the control packet for the conventional component system shown in FIG. 13(a). Thus, the control packet consists of a sequence of words of 10 bits, and the number of words is fixed to 19. Although the control packet according to the embodiment has specifications similar to those of the control packet for the conventional component system shown in FIG. 13(a), it is not always required to be so, and any control packet containing words which are at least related to an audio data of an audio packet may be used.

FIG. 15(b) shows a data format of an audio packet for a transmission system according to the invention. The audio packet consists of a sequence of words of 10 bits, and the number of words is always fixed to 21. An ANC data flag (AFC) consists of three words (000, 3FF, 3FF). Data I (DID) indicates to which of audio groups 1, 2, 3 and 4 the audio packet pertains. Data-block number (DBN) is a serial number applied to audio packets that pertain to a same audio group, when digital audio data of four audio groups are subgrouped to audio packets, and has a value periodically changed within a range of 1 to 255 assigned thereto. Data count (DC) indicates the number of words in a user data. The user data is a subframe (AD1, AD2, AD3 or AD4) or clock phase information (PI) comprising three words. A data concerning digital audio data is assigned to the subframe (AD1, AD2, AD3 or AD4). The clock phase information (PI) of digital audio data is for synchronization in frequency and phase with a video signal that is independent of the audio packet, and provides clock phase information set according to the video signal. To check sum (CS), an error detecting code of the audio packet is assigned. It is required by specifications of the transmission system of serial digital signals pertinent to an apparatus according to the embodiment that the audio packet contains a data block number (DBN), clock phase information (PI) and check sum (CS).

Now, constitution of the embodiment is described with reference to FIG. 7. A buffer memory 301 is for temporarily holding the audio packet. A CS error detecting circuit 302 is for detecting an audio packet having an error by means of the check sum (CS) of the audio packet. A data block number detecting circuit 303 is for detecting the data block number (DBN) from the audio packet data. A clock phase information detecting circuit 304 is for detecting clock phase information (PI) from the audio packet data. A sampling frequency detecting circuit 5 is for detecting a sampling frequency of digital audio data contained in the audio packet from RATE of the control packet. An estimated value generating circuit 306 is for generating an estimated value of the clock phase information in relation to the audio packet that is read out of the buffer memory 301. A control circuit 307 is for controlling interpolation. An interpolation data generating circuit 308 is for generating an interpolation data for an audio packet corresponding to that requiring interpolation. A substitute inserting circuit 309 is controlled by the control circuit 307 for outputting either an audio packet input from the buffer memory or an interpolation data input from the interpolation data generating circuit 8. A delay circuit 310 is for delaying the audio packet input from the substitute inserting circuit 309 by an audio packet.

Now, operation of the embodiment is described.

The control packet is inputted to the sampling frequency detecting circuit 305 once before each field. The sampling frequency detecting circuit 305 detects the value of a sampling frequency from RATE of the control packet, and provides it as an output to the estimated value generating circuit 306. The estimated value generating circuit 306 stores the sampling frequency until the value of a next sampling frequency is received.

The audio packet applied to the apparatus according to the embodiment is first inputted to the buffer memory 301, and temporarily stored therein. A plurality of audio packets are stored in the buffer memory 301, which are inputted in the FIFO order. However, an audio packet may be lost without being inputted to the buffer memory 301 during transmission due to some cause. Such audio packet is hereinafter referred to as lost audio packet.

The buffer memory 301 provides an audio packet data that has been received first by the buffer memory 301 to the CS error detecting circuit 302, data block number detecting circuit 303 and clock phase information detecting circuit 304 according to the control signal from the control circuit 307.

When the audio packet data output from the buffer memory 301 is received, the CS error detecting circuit 302 detects any error in the audio packet by using the check sum (CS). If an error is detected, because interpolation is required for the audio packet, the CS error detecting circuit 302 provides an error signal to the control circuit 307.

When the audio packet data output from the buffer memory 301 is received, the data block number detecting circuit 303 detects a data block number (DBN). Parallel with the detection, the data block number detecting circuit 303 also detects a data block number of an audio packet immediately proceeding the audio packet that is inputted from the delay circuit 310. The data block number detecting circuit 303 detects for any lost audio packet on the basis of said two data block numbers, and provides a lost packet signal to the control circuit 307.

The data block number (DBN) is applied to audio packets that pertain to a same audio group, when audio digital data of a same audio group is subgrouped to audio packets, and has a value periodically changed within a range of 1 to 255. The audio packets are sent according to the order of the block numbers applied thereto. Then, when the DBN of an audio packet inputted from the delay circuit 310 to the data block number detecting circuit 303 is 5, for example, the DBN of an audio packet inputted from the buffer memory 1 to the data block number detecting circuit 303 comes to be 6, if any error is caused. In this case, if the DBN of an audio packet inputted from the buffer memory 301 to the data block number detecting circuit 303 is 7, it is detected that an audio packet of DBN of 6 is lost. In such manner, by using the data block number (DBN), lost audio packets can be detected.

When the audio packet data output from the buffer memory 1 is received, the clock phase information detecting circuit 304 detects clock phase information (PI) from the data, and provides it as an output to the control circuit 307.

Parallel with the processing for outputting the clock phase information (PI), the estimated value generating circuit 306 detects the clock phase information (PI) of the audio packet received from the delay circuit 310.

The clock phase information (PI) specifies the location of an audio signal in a coordinate system corresponding to a frame (including a blanking period) of a video signal that is a main signal by using the clock frequency of the video signal. Then, for the purpose of explanation, when a component system of SMPTE259M is taken for example, although an audio packet thereof does not have a fixed length, and it is assumed that the clock frequency of a video signal which is a main signal is 27 MHz, and the sampling frequency of an audio signal which is a supplemental signal is 48 kHz, an interval of two audio packets transmitted in sequence can be obtained from a formula of {clock frequency T of a video signal/sampling frequency of an audio signal}, and is expressed as being 562 or 563 by a value of such clock phase information (PI). In this case, the clock phase information (PI) ranges from 0 to 1715. Thus, if a value of the clock phase information (PI) of the audio packet inputted from the delay circuit 310 to the estimated value generating circuit 306 is 100, a value of the clock phase information (PI) of an audio packet inputted to from the buffer memory 1 to the clock phase information detecting circuit 4 is estimated to be either 662 or 663.

As described above, the estimated value generating circuit 306 generates an estimated value of the clock phase information corresponding to the clock phase information (PI) of the audio packet data that is inputted from the buffer memory 301 to the clock phase information detecting circuit 304 on the bases of the clock phase information (PI) of the audio packet received from the delay circuit 310 and the sampling frequency. Then, the estimated value generating circuit 306 provides the estimated value generated as an output to the control circuit 307 and the interpolation data generating circuit 308.

When the clock phase information (PI) detected by the clock phase information detecting circuit 4 is compared with the estimated value generated by the estimated value generating circuit 306, if a difference between them is significant, either such trouble as a lost audio packet or an error in the clock phase information (PI) can be suspected. Then, if the difference between them approximately corresponds to an audio package, it is supposed that an audio packet is lost. Thus, the control circuit 307 functions for detecting both a lost audio packet and an error in the clock phase information (PI).

The control circuit 307 controls interpolation according to input signals from the CS error detecting circuit 302, data block number detecting circuit 303, clock phase information detecting circuit 304 and estimated value generating circuit 306.

When an interpolation request is received by means of an error signal input from the CS error detecting circuit 302, the control circuit 307 allows the buffer memory 1 to output an audio packet to the substitute inserting circuit 309. At the time of such output, the control circuit 307 allows the buffer memory 301 to delete the audio packet data.

Then, the control circuit 307 controls the interpolation data generating circuit 308 so that it generates an interpolation data corresponding to the audio packet output from the buffer memory 301, and provides it as an output to the substitute inserting circuit 309. The interpolation data generating circuit 308 generates the interpolation data corresponding to the audio packet output from the buffer memory 1 by using the audio packet input from the delay circuit 310 according to the control by the control circuit 307. The substitute inserting circuit 309 outputs the interpolation data input from the interpolation data generating circuit 308 instead of the audio packet input from the buffer memory 301 according to the control by the control circuit 307.

When a notification of detection of a lost audio packet is received by means of a lost packet signal input from the data block number detecting circuit 303, and/or a lost audio packet is detected by clock phase information (PI) input from the clock phase information detecting circuit 304 and an estimated value input from the estimated value generating circuit 306, the control circuit 307 delays output of the audio packet that is attributable to the detection, in the buffer memory 301. Meanwhile, the control packet 307 controls the interpolation data generating circuit 308 so that it generates an interpolation data corresponding to the lost audio packet, and outputs it to the substitute inserting circuit 309. The interpolation data generating circuit 308 generates the interpolation data corresponding to the lost audio packet by using the audio packet input from the delay circuit 310 according to the control by the control circuit 308. The substitute inserting circuit 309 outputs the interpolation data generated by the interpolation data generating circuit 308 according to the control by the control circuit 307.

After the interpolation data is outputted, if any interpolation request for the audio packet of which output from the buffer memory 301 has been delayed by an audio packet is not received from the CS error detecting circuit 302, the control circuit 307 allows the audio packet to be outputted from the buffer memory 301 to the substitute inserting circuit 309. At the time of such output, the control circuit 307 allows the buffer memory 301 to delete the audio packet. Then, the control circuit 307 allows the audio packet to be outputted from the substitute inserting circuit 309 to the delay circuit 310.

After the interpolation data is outputted, if an interpolation request for the audio packet of which output from the buffer memory 301 has been delayed by an audio packet is received from the CS error detecting circuit 302, the control circuit 307 allows the audio packet to be outputted from the buffer memory 301 to the substitute inserting circuit 309. At the time of such output, the control circuit 307 allows the buffer memory 301 to delete the audio packet. Then, the control circuit 307 controls the interpolation data generating circuit 308 so that it generates an interpolation data corresponding to the audio packet output from the buffer memory 301, and provides it as an output to the substitute inserting circuit 309. The interpolation data generating circuit 308 generates the interpolation data corresponding to the audio packet input from the delay circuit 310 according to the control by the control circuit 307. The substitute inserting circuit 309 outputs the interpolation data input from the interpolation data generating circuit 308 instead of the audio packet input from the buffer memory 301 according to the control by the control circuit 307.

When the control circuit 307 determines interpolation of any audio packet isn't required on the basis of signal inputs from the CS error detecting circuit 302, data block number detecting circuit 303, clock phase information detecting circuit 304 and estimated value generating circuit 306, it allows the audio packet to be outputted from the buffer memory 301 to the substitute inserting circuit 309. At the time of such output, the control circuit 307 allows the buffer memory 301 to delete the audio packet. Then, the control circuit 307 allows the audio packet to be outputted from the substitute inserting circuit 309 to the delay circuit 310.

Although the interpolation data generating circuit 308 generates an interpolation data corresponding to an audio packet to be interpolated in the embodiment, this may be further limited such that an interpolation data corresponding to an audio data of an audio packet to be interpolated is generated. Or an interpolation data corresponding to clock phase information (PI) of an audio packet to be interpolated may be generated.

In the embodiment, although the sampling frequency is detected by using RATE of a control packet, it is not always required to be so, and the audio sampling frequency may be estimated (as being 48 kHz at 562 or 563) by using clock phase information (PI) of an audio packet. In such way, the sampling frequency detecting circuit 305 may be constructed such that it not only inputs the control packets but also the audio packets from the delay circuit 310 or buffer memory 301, so that the sampling frequency can be estimated by using clock phase information (PI) of the audio packet.

Additionally in the embodiment, although the data block number detecting circuit 303 is provided with data block number detecting means and lost audio packet detecting means or first lost audio packet detecting means in the present invention, it is not always required to be of such constitution, and may be provided with the data block number detecting means, while the control circuit 307 may be provided with the lost audio packet detecting means according to claim 1 or the first lost audio packet detecting means. In such case, however, an input signal line from the delay circuit 310 to the data block number detecting circuit 303 is required to be lead to the control circuit 307 instead of the data block number detecting circuit 303.

In the embodiment, although the data block number detecting circuit 303 is constructed such that it reads an immediately preceding audio packet from the delay circuit 310 for detecting a lost audio packet, it is not always required to be so constructed, and means for updating and storing the latest data block number (DBN) may be provided in the data block number detecting circuit 303 (the lost audio packet detecting means or the first lost audio packet detecting means in the present invention). In such case, an input signal line from the delay circuit 310 to the data block number detecting circuit 303 can be eliminated.

Figure 8:
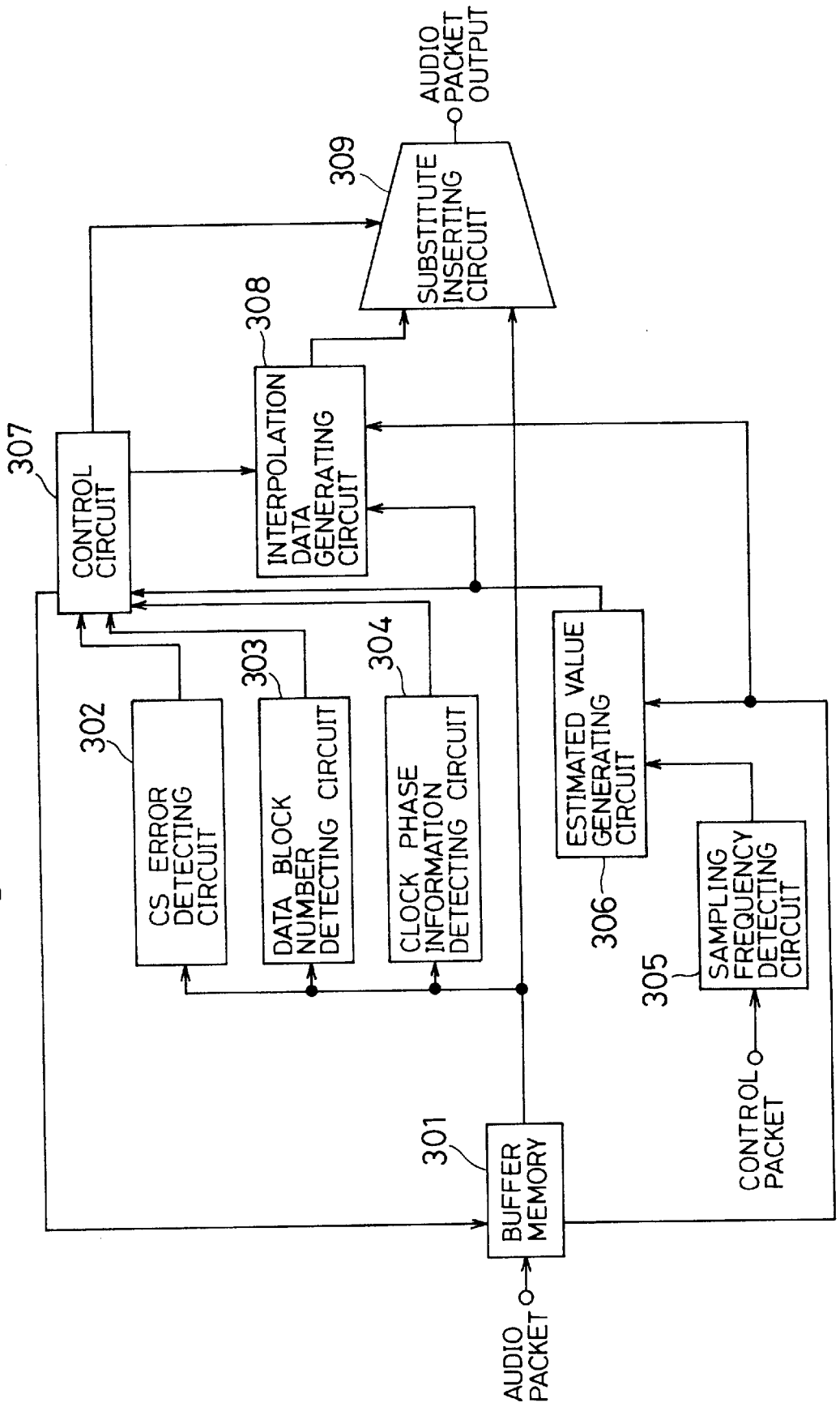
FIG. 8 is a block diagram showing a constitution of an audio packet interpolating device according to an embodiment of the invention.

Although memory means is separated to the buffer memory 301 and delay circuit 310, audio packets following one under process are read from the buffer memory 301, and an audio packet immediately preceding the one under process is read from the delay circuit 310 in the embodiment, it is not always required to be so, and the delay circuit may be contained as a delay memory in the buffer memory 301, as shown in FIG. 8, so that audio packets are read from the buffer memory 301 in either case. In such case, however, in order to allow audio packets read in the FIFO order to be referred to even after they are read, it is required that the audio packets stored in the buffer memory 301 are deleted at a delayed timing, while the FIFO order is maintained.

In the embodiment, although an audio packet referred to for interpolation is limited to one immediately preceding an audio packet under process, it is not always required according to a constitution shown in FIG. 7, and plural audio packets preceding the one under process and/or plural audio packets following the one under process may be referred to for interpolation.

Further, although an audio packet for the serial digital signal transmission system pertinent to the apparatus of the embodiment should be one containing data block number (DBN), clock phase information (PI) and check sum (CS) in the embodiment, it is not always required to be so limited, and may be a packet containing clock phase information (PI) or data block number (DBN) and check sum (CS). It means that an audio packet for the serial digital transmission system pertinent to the apparatus of the invention is handled as of a fixed length, even if it is of a fixed length or variable length, and is only required to contain words of clock phase information (PI) and/or data block number (DBN).

Accordingly, not only in the case an audio packet is of a fixed length containing data block number (DBN) and/or clock phase information (PI), but in the serial digital signal transmission system of SMPTE 259M, interpolation of a lost audio packet using the data block number (DBN) can be achieved by fixing the number of words in a subframe, thus, the audio packet. Moreover, by adding clock phase information (PI) of a fixed length to the user data, as shown in FIG. 15(*b*), interpolation of a lost packet using the data block number (DBN) and clock phase information (PI) can be achieved.

Figure 9:
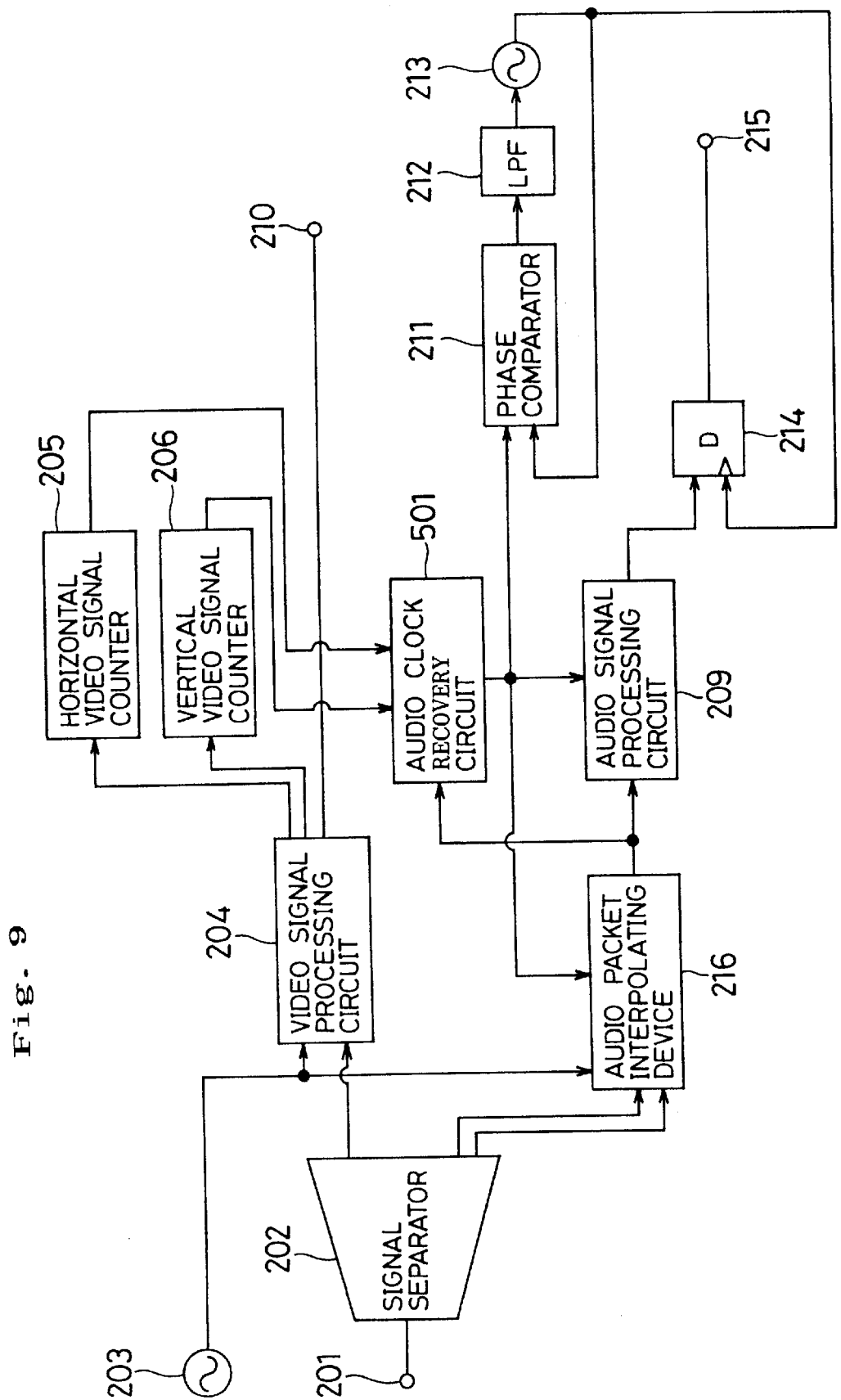
FIG. 9 is a block diagram showing a constitution of a video and audio signal multiplex transmitting apparatus according to an embodiment of the invention.
Figure 10:
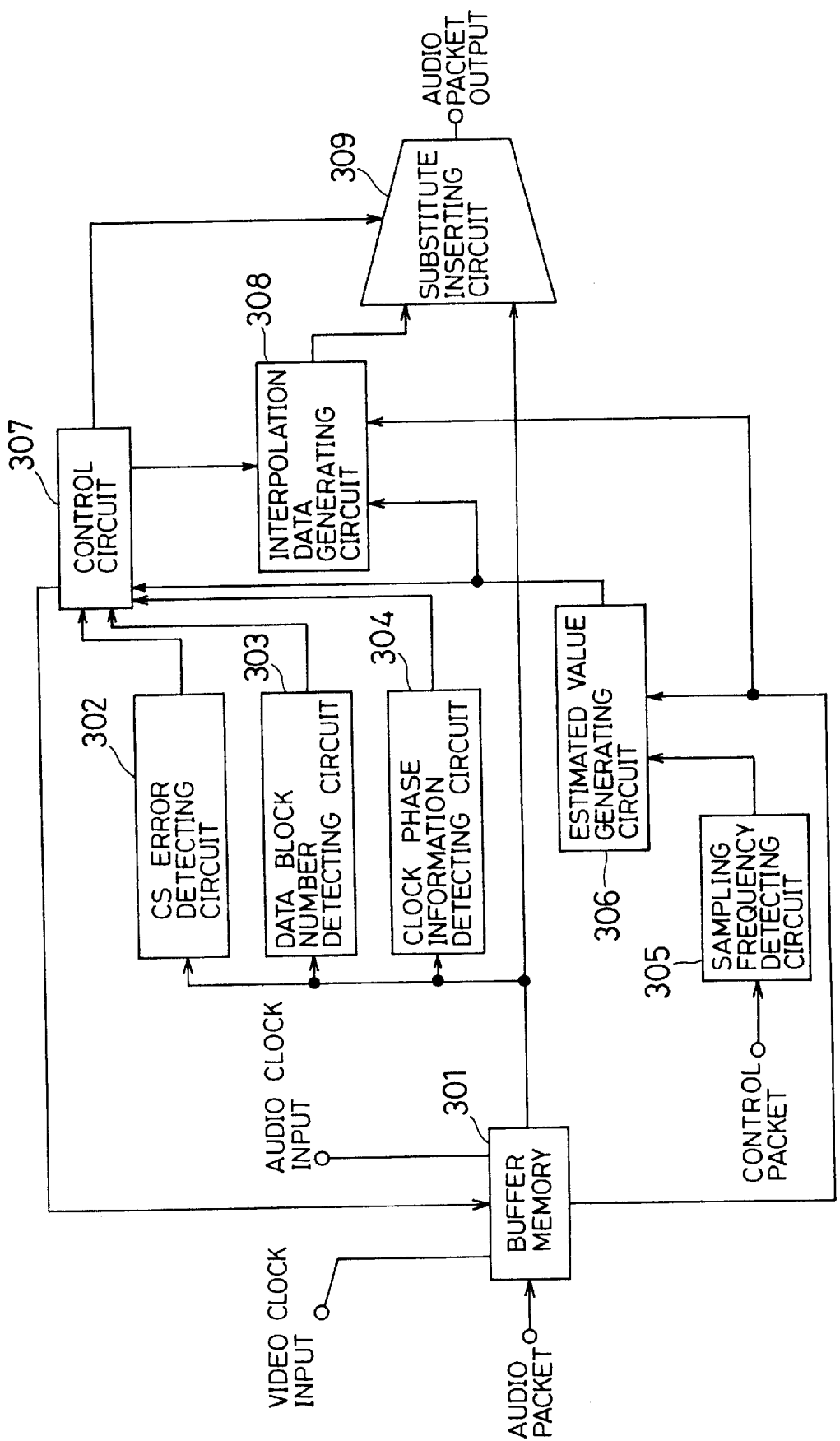
FIG. 10 is a block diagram showing a constitution of a video and audio signal multiplex transmitting apparatus according to an embodiment of the invention.
Figure 11:
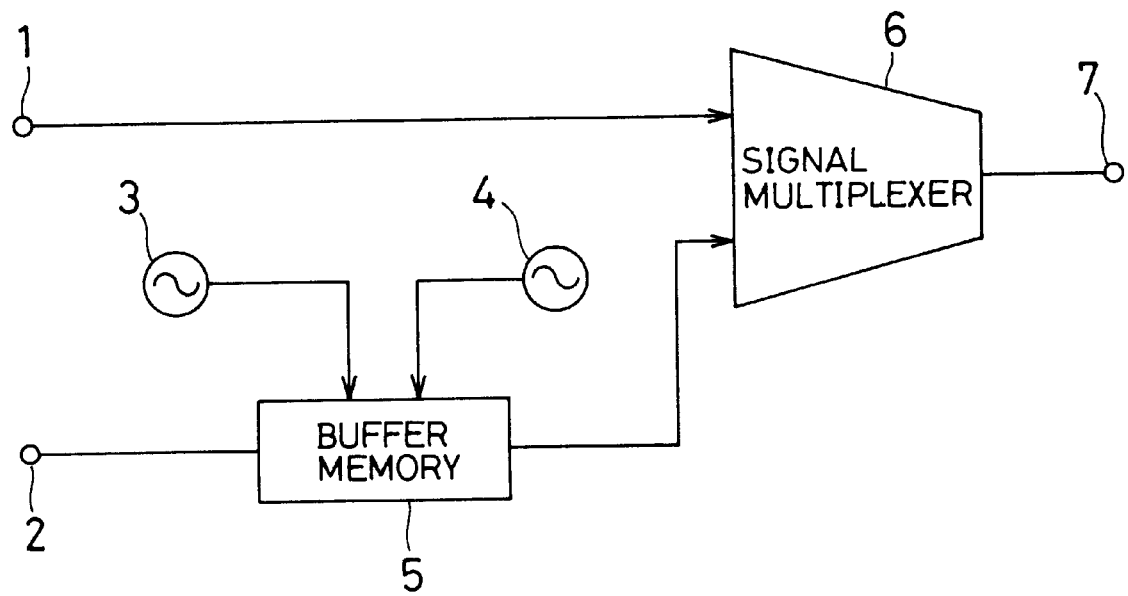
FIG. 11 is a block diagram showing a constitution of a video and audio signal multiplex sending apparatus according to an embodiment of the prior art.
Figure 12:
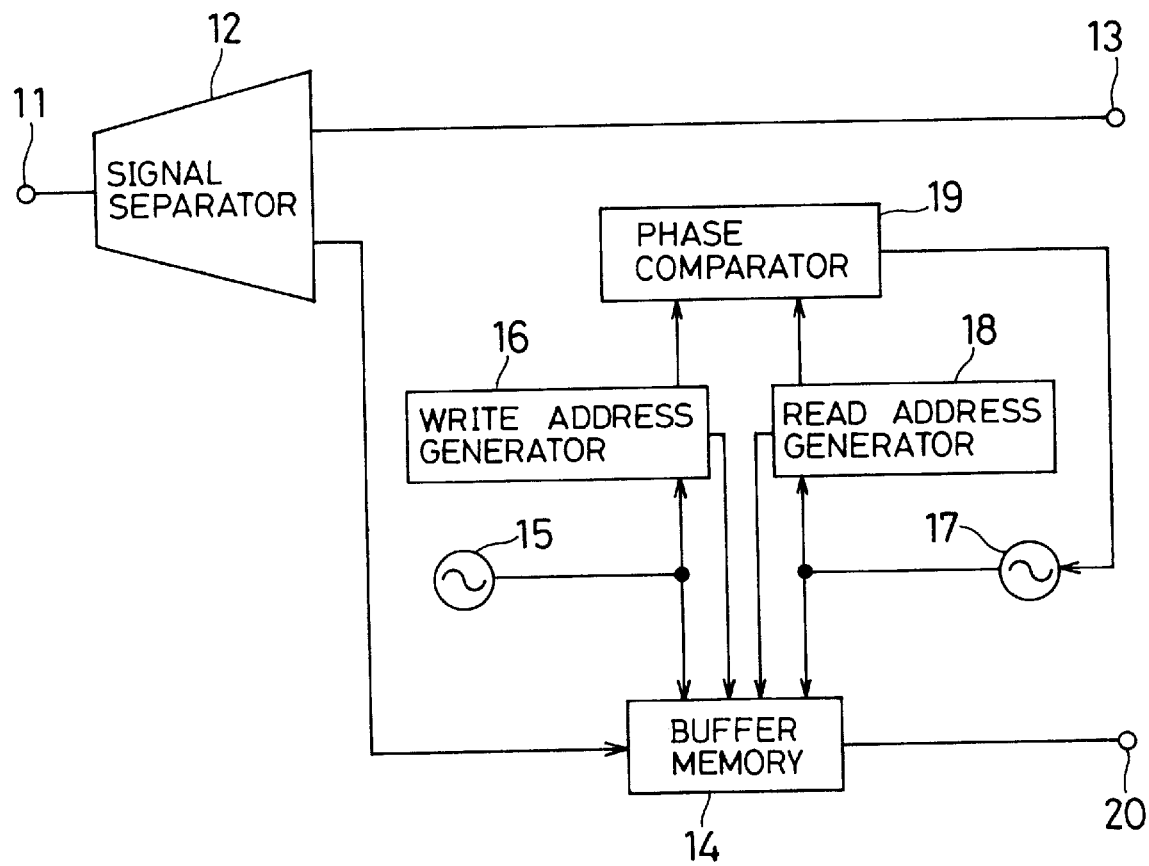
FIG. 12 is a block diagram showing a constitution of a video and audio signal multiplex receiving apparatus according to an embodiment of the prior art.

FIGS. 9 and 10 are a block diagram showing an embodiment of a video and audio multiplex transmitting apparatus according to the invention, respectively. The constitution of FIG. 9 is different from that of the video and audio signal multiplex transmitting apparatus of FIG. 5 in that the buffer memory is replaced by an audio packet interpolating device 216 shown in FIG. 10, and a signal separator 202 is constructed such that it separates audio control packets in addition to video and audio signals.

The audio packet interpolating device of FIG. 10 is constructed similarly to the audio packet interpolating device according to the embodiment of the invention shown in FIG. 8. However, an audio data is written in a buffer memory 307 by means of a video clock, and read from the buffer memory by means of an audio clock.

In such manner, by interpolating a lost audio packet in the audio packet interpolating device 216, and recovering an audio clock by using clock phase information transmitted, a video and audio signal multiplex transmitting apparatus capable of storing a phase relation between video and audio signals in the sending side, and providing an audio signal output of a high quality for reproduction of an audio signal with less jitter can be provided.

What is claimed is:

1. A video and audio signal multiplex sending apparatus comprising:

a horizontal counter for providing a horizontal phase signal output of a video signal;

a vertical counter for providing a vertical phase signal output of the video signal;

an audio clock signal multiplexing circuit for multiplexing audio clock information with an audio signal according to the horizontal and vertical phase signal outputs; and signal multiplexing means for multiplexing the audio signal multiplexed with the audio clock information and the video signal, and sending the multiplex signal.

2. A video and audio signal multiplex receiving apparatus comprising:

signal separating means for receiving a multiplex signal of an audio signal multiplexed in a blanking period of a video signal from the video and audio signal multiplex sending apparatus according to claim 1, and separating the multiplex signal received to a video signal and an audio signal multiplexed with audio clock information, said multiplex signal being a digital signal having a data format of a fixed length;

a horizontal counter for providing a horizontal phase signal output of the video signal separated;

a vertical counter for providing a vertical phase signal output of the video signal;

an audio clock recovery circuit for recovering an audio clock from the audio clock information multiplexed with the audio signal according to the horizontal and vertical phase signal outputs;

a buffer memory for temporarily storing the audio signal separated, and read the audio signal stored by using the audio clock recovered; and an audio signal processing circuit for processing the audio signal read according to the audio clock.

3. A video and audio signal multiplex receiving apparatus according to claim 2, further comprising:

a clock oscillator for generating a clock that is controlled by a control voltage;

a phase comparator for comparing an output of the clock oscillator with that of the audio clock recovery circuit to obtain the control voltage for the clock oscillator; and a flip-flop for holding the output of the audio signal processing circuit by means of the output of the clock oscillator.

4. A video and audio signal multiplex receiving apparatus comprising:

signal separating means for receiving a multiplex signal of an audio signal multiplexed in a blanking period of a video signal from the video and audio signal multiplex sending apparatus according to claim 1, and separating the multiplex signal received to a video signal and an audio signal multiplexed with audio clock information, said multiplex signal being a digital signal having a data format of a fixed length;

a horizontal counter for providing a horizontal phase signal output of the video signal separated;

a vertical counter for providing a vertical phase signal output of the video signal;

an audio clock recovery circuit for recovering an audio clock from the audio clock information multiplexed with the audio signal according to the horizontal and vertical phase signal outputs;

a clock oscillator for generating a clock that is controlled by a control voltage;

a phase comparator for comparing an output of the clock oscillator with that of the audio clock recovery circuit to obtain the control voltage for the clock oscillator;

a buffer memory for temporarily storing the audio signal separated, and reading the audio signal stored by using the output of the clock oscillator; and an audio signal processing circuit for processing the audio signal read according to the output of the clock oscillator.

5. A video and audio signal multiplex receiving apparatus comprising:

signal separating means for receiving a multiplex signal of an audio signal multiplexed in a blanking period of a video signal from the video and audio signal multiplex sending apparatus according to claim 1, and separating the multiplex signal received to a video signal and an audio signal multiplexed with audio clock information, said multiplex signal being a digital signal having a data format of a fixed length;

a horizontal counter for providing a horizontal phase signal output of the video signal separated;

a buffer memory for temporarily storing the audio signal separated;

a digital phase comparator for comparing an output from the buffer memory with the horizontal phase signal output; and a clock oscillator for generating a clock according to an output of the digital phase comparator; wherein the audio signal stored in the buffer memory is outputted by using an output of the clock oscillator.

6. A video and audio signal multiplex receiving apparatus comprising:

signal separating means for receiving a multiplex signal of an audio signal multiplexed in a blanking period of a video signal from the video and audio signal multiplex sending apparatus according to claim 1, and separating the multiplex signal received to a video signal and an audio signal multiplexed with audio clock information, said multiplex signal being a digital signal having a data format of a fixed length;

a buffer memory for temporarily storing the audio signal separated;

an audio clock recovery circuit for recovering an audio clock from an audio signal that is outputted from the buffer memory; and an audio signal processing circuit for processing the audio signal outputted from the buffer memory according to an output of the audio clock recovery circuit; wherein the audio signal stored in the buffer memory is outputted by using the output of the audio clock recovery circuit.

7. A video and audio signal multiplex receiving apparatus according to claim 6, further comprising:

a clock oscillator for generating a clock that is controlled by a control voltage;

a phase comparator for comparing an output of the clock oscillator with that of the audio clock recovery circuit to obtain the control voltage for the clock oscillator; and a flip-flop for holding an output of the audio signal processing circuit by the output of the clock oscillator.

8. A video and audio signal multiplex receiving apparatus comprising:

signal separating means for receiving a multiplex signal of an audio signal multiplexed in a blanking period of a video signal from the video and audio signal multiplex sending apparatus according to claim 1, and separating the multiplex signal received to a video signal and an audio signal multiplexed with audio clock information, said multiplex signal being a digital signal having a data format of a fixed length;

a buffer memory for temporarily storing the audio signal separated;

an audio clock recovery circuit for recovering an audio clock from an audio signal that is outputted from the buffer memory;

a clock oscillator for generating a clock for audio signal processing, said clock being controlled by a control voltage;

a phase comparator for comparing an output of the clock oscillator with that of the audio clock recovery circuit to obtain the control voltage of the clock oscillator; and an audio signal processing circuit for processing the audio signal outputted from the buffer memory according to an output of the clock oscillator; wherein the audio signal stored in the buffer memory is outputted by using the output of the clock oscillator.

9. A video and audio signal multiplex transmitting apparatus comprising the video and audio signal multiplex sending apparatus according to claim 1 and a video and audio signal multiplex receiving apparatus comprising:

signal separating means for receiving a multiplex signal of an audio signal multiplexed in a blanking period of a video signal from the video and audio signal multiplex sending apparatus, and separating the multiplex signal received to a video signal and an audio signal multiplexed with audio clock information, said multiplex signal being a digital signal having a data format of a fixed length;

a horizontal counter for providing a horizontal phase signal output of the video signal separated;

a vertical counter for providing a vertical phase signal output of the video signal;

an audio clock recovery circuit for recovering an audio clock from the audio clock information multiplexed with the audio signal according to the horizontal and vertical phase signal outputs;

a buffer memory for temporarily storing the audio signal separated, and read the audio signal stored by using the audio clock recovered; and an audio signal processing circuit for processing the audio signal read according to the audio clock.

10. A video and audio signal multiplex transmitting apparatus comprising the video and audio signal multiplex sending apparatus according to claim 1 and a video and audio signal multiplex receiving apparatus comprising:

signal separating means for receiving a multiplex signal of an audio signal multiplexed in a blanking period of a video signal from the video and audio signal multiplex sending apparatus, and separating the multiplex signal received to a video signal and an audio signal multiplexed with audio clock information, said multiplex signal being a digital signal having a data format of a fixed length;

a horizontal counter for providing a horizontal phase signal output of the video signal separated;

a vertical counter for providing a vertical phase signal output of the video signal;

an audio clock recovery circuit for recovering an audio clock from the audio clock information multiplexed with the audio signal according to the horizontal and vertical phase signal outputs;

a buffer memory for temporarily storing the audio signal separated, and read the audio signal stored by using the audio clock recovered;

an audio signal processing circuit for processing the audio signal read according to the audio clock;

a clock oscillator for generating a clock that is controlled by a control voltage;

a phase comparator for comparing an output of the clock oscillator with that of the audio clock recovery circuit to obtain the control voltage for the clock oscillator; and a flip-flop for holding the output of the audio signal processing circuit by means of the output of the clock oscillator.

11. A video and audio signal multiplex transmitting apparatus comprising the video and audio signal multiplex sending apparatus according to claim 1 and a video and audio signal multiplex receiving apparatus comprising:

signal separating means for receiving a multiplex signal of an audio signal multiplexed in a blanking period of a video signal from the video and audio signal multiplex sending apparatus, and separating the multiplex signal received to a video signal and an audio signal multiplexed with audio clock information, said multiplex signal being a digital signal having a data format of a fixed length;

a horizontal counter for providing a horizontal phase signal output of the video signal separated;

a vertical counter for providing a vertical phase signal output of the video signal;

an audio clock recovery circuit for recovering an audio clock from the audio clock information multiplexed with the audio signal according to the horizontal and vertical phase signal outputs;

a clock oscillator for generating a clock that is controlled by a control voltage;

a phase comparator for comparing an output of the clock oscillator with that of the audio clock recovery circuit to obtain the control voltage for the clock oscillator;

a buffer memory for temporarily storing the audio signal separated, and reading the audio signal stored by using the output of the clock oscillator; and an audio signal processing circuit for processing the audio signal read according to the output of the clock oscillator.

12. A video and audio signal multiplex transmitting apparatus comprising the video and audio signal multiplex sending apparatus according to claim 1 and a video and audio signal multiplex receiving apparatus comprising:

signal separating means for receiving a multiplex signal of an audio signal multiplexed in a blanking period of a video signal from the video and audio signal multiplex sending apparatus, and separating the multiplex signal received to a video signal and an audio signal multiplexed with audio clock information, said multiplex signal being a digital signal having a data format of a fixed length;

a horizontal counter for providing a horizontal phase signal output of the video signal separated;

a buffer memory for temporarily storing the audio signal separated;

a digital phase comparator for comparing an output from the buffer memory with the horizontal phase signal output; and a clock oscillator for generating a clock according to an output of the digital phase comparator;

wherein the audio signal stored in the buffer memory is outputted by using an output of the clock oscillator.

13. A video and audio signal multiplex transmitting apparatus comprising the video and audio signal multiplex sending apparatus according to claim 1 and a video and audio signal multiplex receiving apparatus comprising:

signal separating means for receiving a multiplex signal of an audio signal multiplexed in a blanking period of a video signal from the video and audio signal multiplex sending apparatus, and separating the multiplex signal received to a video signal and an audio signal multiplexed with audio clock information, said multiplex signal being a digital signal having a data format of a fixed length;

a buffer memory for temporarily storing the audio signal separated;

an audio clock recovery circuit for recovering an audio clock from an audio signal that is outputted from the buffer memory; and an audio signal processing circuit for processing the audio signal outputted from the buffer memory according to an output of the audio clock recovery circuit;

wherein the audio signal stored in the buffer memory is outputted by using the output of the audio clock recovery circuit.

14. A video and audio signal multiplex transmitting apparatus comprising the video and audio signal multiplex sending apparatus according to claim 1 and a video and audio signal multiplex receiving apparatus comprising:

signal separating means for receiving a multiplex signal of an audio signal multiplexed in a blanking period of a video signal from the video and audio signal multiplex sending apparatus, and separating the multiplex signal received to a video signal and an audio signal multiplexed with audio clock information, said multiplex signal being a digital signal having a data format of a fixed length;

a buffer memory for temporarily storing the audio signal separated;

an audio clock recovery circuit for recovering an audio clock from an audio signal that is outputted from the buffer memory;

an audio signal processing circuit for processing the audio signal outputted from the buffer memory according to an output of the audio clock recovery circuit;

a clock oscillator for generating a clock that is controlled by a control voltage;

a phase comparator for comparing an output of the clock oscillator with that of the audio clock recovery circuit to obtain the control voltage for the clock oscillator; and a flip-flop for holding an output of the audio signal processing circuit by the output of the clock oscillator wherein the audio signal stored in the buffer memory is outputted by using the output of the audio clock recovery circuit.

15. A video and audio signal multiplex transmitting apparatus comprising the video and audio signal multiplex sending apparatus according to claim 1 and a video and audio signal multiplex receiving apparatus comprising:

signal separating means for receiving a multiplex signal of an audio signal multiplexed in a blanking period of a video signal from the video and audio signal multiplex sending apparatus, and separating the multiplex signal received to a video signal and an audio signal multiplexed with audio clock information, said multiplex signal being a digital signal having a data format of a fixed length;

a buffer memory for temporarily storing the audio signal separated;

an audio clock recovery circuit for recovering an audio clock from an audio signal that is outputted from the buffer memory;

a clock oscillator for generating a clock for audio signal processing, said clock being controlled by a control voltage;

a phase comparator for comparing an output of the clock oscillator with that of the audio clock recovery circuit to obtain the control voltage of the clock oscillator; and an audio signal processing circuit for processing the audio signal outputted from the buffer memory according to an output of the clock oscillator;

wherein the audio signal stored in the buffer memory is outputted by using the output of the clock oscillator.

16. A video and audio signal multiplex receiving apparatus according to claim 7, further comprising:

memory means for temporarily storing audio packet data included in at least an audio packet, said audio packet being fixed-length word and including audio data and data related to other information;

data block number detecting means for detecting a data block number from the audio packet data read from said memory means according to a predetermined order, said data block number being a serial number applied to the audio packet;

lost audio packet detecting means for detecting a lost audio packet on the basis of said data block number;

interpolation data generating means for generating interpolation data corresponding to said lost audio packet by using the audio packet data readable from said memory means, if any audio packet is lost, according to a result of detection by said lost audio packet detecting means; and interpolation data inserting means for outputting said interpolation data according to an order in correspondence with said lost audio packet if any audio packet is lost, and outputting the audio packet data read from said memory means is no audio packet is lost, according to the result of detection by said lost audio packet detecting means.

17. A video and audio signal multiplex receiving apparatus according to claim 7, further comprising:

memory means for temporarily storing audio packet data included in at least an audio packet, said audio packet being fixed-length word and including audio data and data related to other information;

clock phase information detecting means for detecting clock phase information from the audio packet data read from said memory means according to a FIFO order, said clock phase information representing a location of an audio signal in relation to a video signal for synchronization of frequency and phase between the audio and video signals that are independent of each other;

sampling frequency detecting means for detecting a sampling frequency for the audio signal obtained from said audio packet data;

estimated value generating means for generating an estimated value relating to the clock phase information included in the audio packet data read from said memory means by using the clock phase information contained in separate audio packet data that is readable from said memory means and the sampling frequency;

lost audio packet detecting means for detecting a lost audio packet on the basis of the clock phase information detected by said clock has information detecting means and said estimated value;

interpolation data generating means for generating interpolation data corresponding to said lost packet by using the audio packet data readable from said memory means, if any audio packet is lost, according to a result of detection by said lost audio packet detecting means; and interpolation data inserting means for outputting said interpolation data according to an order in correspondence with said lost audio packet if any audio packet is lost, and outputting the audio packet data read from said memory means if no audio packet is lost, according to the result of detection by said lost audio packet detecting means.

18. A video and audio signal multiplex receiving apparatus according to claim 7, further comprising:

memory means for temporarily storing audio packet data included in at least an audio packet, said audio packet being fixed-length word and including audio data and data relating to other information;

data block number detecting means for detecting a data block number from the audio packet data read from said memory means according to a predetermined order, said data block number being a serial number applied to the audio packet;

first lost audio packet detecting means for detecting a lost audio packet according to said data block number;

clock phase information detecting means for detecting clock phase information from the audio packet data read form said memory means according to a FIFO order, clock phase information representing a location of an audio signal in relation to a video signal for synchronization of frequency and phase between the audio and video signals that are independent of each other;

sampling frequency detecting means for detecting a sampling frequency for the audio signal obtained from said audio packet data;

estimated value generating means for generating an estimated value relating to the clock phase information included in the audio packet data read from said memory means by using the clock phase information contained in the audio packet data that is readable from said memory means and the sampling frequency;

second lost audio packet detecting means for detecting a lost audio packet on the basis of the clock phase information detected by said clock phase information detecting means and said estimated value;

interpolation data generating means for generating interpolation data corresponding to the lost packet by using the audio packet data readable from said memory means, if any audio packet is lost, according to a result of detection by said first and second lost audio packet detecting means; and interpolation data inserting means for outputting said interpolation data according to an order in correspondence with the lost audio packet if any audio packet is lost, and outputting the audio packet data read from said memory means if no audio packet is lost, according to the result of detection by said first and second lost audio packet detecting means.

19. A video and audio signal multiplex receiving apparatus according to claim 8, further comprising:

memory means for temporarily storing audio packet data included in at least an audio packet, said audio packet being fixed-length word and including audio data and data related to other information;

data block number detecting means for detecting a data block number from the audio packet data read from said memory means according to a predetermined order, said data block number being a serial number applied to the audio packet;

lost audio packet detecting means for detecting a lost audio-packet on the basis of said data block number;

interpolation data generating means for generating interpolation data corresponding to said lost audio packet by using the audio packet data readable from said memory means, if any audio packet is lost, according to a result of detection by said lost audio packet detecting means; and interpolation data inserting means for outputting said interpolation data according to an order in correspondence with said lost audio packet if any audio packet is lost, and outputting the audio packet data read from said memory means is no audio packet is lost, according to the result of detection by said lost audio packet detecting means.

20. A video and audio signal multiplex receiving apparatus according to claim 8, further comprising:

memory means for temporarily storing audio packet data included in at least an audio packet, said audio packet being fixed-length word and including audio data and data related to other information;

clock phase information detecting means for detecting clock phase information from the audio packet data read from said memory means according to a FIFO order, said clock phase information representing a location of an audio signal in relation to a video signal for synchronization of frequency and phase between the audio and video signals that are independent of each other;

sampling frequency detecting means for detecting a sampling frequency for the audio signal obtained from said audio packet data;

estimated value generating means for generating an estimated value relating to the clock phase information included in the audio packet data read from said memory means by using the clock phase information contained in separate audio packet data that is readable from said memory means and the sampling frequency;

lost audio packet detecting means for detecting a lost audio packet on the basis of the clock phase information detected by said clock phase information detecting means and said estimated value;

interpolation data generating means for generating interpolation data corresponding to said lost packet by using the audio packet data readable from said memory means, if any audio packet is lost, according to a result of detection by said lost audio packet detecting means; and interpolation data inserting means for outputting said interpolation data according to an order in correspondence with said lost audio packet if any audio packet is lost, and outputting the audio packet data read from said memory means if no audio packet is lost, according to the result of detection by said lost audio packet detecting means.

21. A video and audio signal multiplex receiving apparatus according to claim 8, further comprising:

memory means for temporarily storing audio packet data included in at least an audio packet, said audio packet being fixed-length word and including audio data and data relating to other information;

data block number detecting means for detecting a data block number from the audio packet data read from said memory means according to a predetermined order, said data block number being a serial number applied to the audio packet;

first lost audio packet detecting a means for detecting a lost audio packet according to said data block number;

clock phase information detecting means for detecting clock phase information from the audio packet data read form said memory means according to a FIFO order, clock phase information representing a location of an audio signal in relation to a video signal for synchronization of frequency and phase between the audio and video signals that are independent of each other;

sampling frequency detecting means for detecting a sampling frequency for the audio signal obtained from said audio packet data;

estimated value generating means for generating an estimated value relating to the clock phase information included in the audio packet data read from said memory means by using the clock phase information contained in the audio packet data that is readable from said memory means and the sampling frequency;

second lost audio packet detecting means for detecting a lost audio packet on the basis of the clock phase information detected by said clock phase information detecting means and said estimated value;

interpolation data generating means for generating interpolation data corresponding to the lost packet by using the audio packet data readable from said memory means, if any audio packet is lost, according to a result of detection by said first and second lost audio packet detecting means; and interpolation data inserting means for outputting said interpolation data according to an order in correspondence with the lost audio packet if any audio packet is lost; and outputting the audio packet data read from said memory means if no audio packet is lost, according to the result of detection by said first and second lost audio packet detecting means.

\* \* \* \* \*